US010902393B2

(12) United States Patent
Wu et al.

(10) Patent No.: US 10,902,393 B2
(45) Date of Patent: Jan. 26, 2021

(54) METHOD, APPARATUS, AND SYSTEM FOR OPERATING AN ELECTRONIC ACCOUNT IN CONNECTION WITH AN ELECTRONIC TRANSACTION

(71) Applicant: Advanced New Technologies Co., Ltd., George Town (KY)

(72) Inventors: Hui Wu, Hangzhou (CN); Bing Wu, Shanghai (CN); Qingqing Yu, Hangzhou (CN); Zhihui Li, Hangzhou (CN); Ji Xu, Hangzhou (CN); Min Zhang, Hangzhou (CN); Bo Yang, Chengdu (CN); Minzhen Guo, Hangzhou (CN)

(73) Assignee: Advanced New Technologies Co., Ltd.

( * ) Notice: Subject to any disclaimer, the term of this patent is extended or adjusted under 35 U.S.C. 154(b) by 447 days.

(21) Appl. No.: 14/710,075

(22) Filed: May 12, 2015

(65) Prior Publication Data
US 2015/0332226 A1 Nov. 19, 2015

(30) Foreign Application Priority Data
May 15, 2014 (CN) .......................... 2014 1 0205929

(51) Int. Cl.
*G06Q 20/12* (2012.01)
*G06Q 20/10* (2012.01)
(Continued)

(52) U.S. Cl.
CPC ........... *G06Q 20/12* (2013.01); *G06Q 20/027* (2013.01); *G06Q 20/10* (2013.01); *G06Q 20/3276* (2013.01); *G06Q 20/425* (2013.01)

(58) Field of Classification Search
CPC .................................................. G06Q 20/12
(Continued)

(56) References Cited

U.S. PATENT DOCUMENTS

| 8,650,124 B2 | 2/2014 | Singh |
| 8,985,442 B1 | 3/2015 | Zhou et al. |

(Continued)

FOREIGN PATENT DOCUMENTS

| CN | 101110819 | 1/2008 |
| JP | 2003141433 | 5/2003 |

(Continued)

OTHER PUBLICATIONS

J. Gao, V. Kulkarni, H. Ranavat, L. Chang and H. Mei, "A 2D Barcode-Based Mobile Payment System," 2009 Third International Conference on Multimedia and Ubiquitous Engineering, Qingdao, 2009, pp. 320-329, doi: 10.1109/MUE.2009.62. (Year: 2009).*

*Primary Examiner* — Jessica Lemieux
(74) *Attorney, Agent, or Firm* — Van Pelt, Yi & James LLP

(57) ABSTRACT

Embodiments of the present application relate to a method, apparatus, and system for operating an electronic account or displaying a payment page. The method includes receiving, from a first client terminal, a payment platform display page acquisition request, providing, to the first client terminal, a payment platform display page, wherein the payment platform display page includes a first script code, wherein in the event that the first script code is executed, the first script code causes the first client terminal to obtain a payment page including a digital object unique identifier from a payment server and to display the payment page, wherein the digital object unique identifier indicates an upcoming payment sum, receiving verification information, and sending the verification information to the payment server to instruct the payment server to execute a deduction operation on an electronic account.

24 Claims, 15 Drawing Sheets

(51) Int. Cl.
*G06Q 20/42* (2012.01)
*G06Q 20/32* (2012.01)
*G06Q 20/02* (2012.01)

(58) Field of Classification Search
USPC .......................................................... 705/39
See application file for complete search history.

(56) References Cited

U.S. PATENT DOCUMENTS

| | | | |
|---|---|---|---|
| 9,171,302 | B2 | 10/2015 | Jooste |
| 9,245,263 | B2* | 1/2016 | Manning ............... G06F 21/554 |
| 2006/0002607 | A1 | 1/2006 | Boncyk |
| 2008/0255991 | A1 | 10/2008 | Wang et al. |
| 2008/0319905 | A1 | 12/2008 | Carlson |
| 2009/0292619 | A1* | 11/2009 | Kagan .................. G06Q 20/102 |
| | | | 705/26.1 |
| 2012/0028609 | A1 | 2/2012 | Hruska |
| 2012/0209749 | A1* | 8/2012 | Hammad ............... G06Q 30/06 |
| | | | 705/27.1 |
| 2012/0215700 | A1 | 8/2012 | Falk et al. |
| 2013/0043305 | A1 | 2/2013 | Zhou et al. |
| 2013/0173465 | A1 | 7/2013 | Talimaa et al. |
| 2013/0219479 | A1 | 8/2013 | Desoto et al. |
| 2013/0246203 | A1 | 9/2013 | Laracey |
| 2013/0282502 | A1 | 10/2013 | Jooste |
| 2014/0032285 | A1 | 1/2014 | Killoran |
| 2014/0101036 | A1 | 4/2014 | Phillips |
| 2014/0282526 | A1* | 9/2014 | Basavaiah ........... H04L 67/1002 |
| | | | 718/1 |
| 2015/0010216 | A1* | 1/2015 | Papastefanou ..... G06K 9/00154 |
| | | | 382/120 |

FOREIGN PATENT DOCUMENTS

| | | |
|---|---|---|
| JP | 2005149036 A | 6/2005 |
| JP | 2005267618 | 9/2005 |
| KR | 20090016164 | 2/2009 |
| KR | 20120108310 | 10/2012 |
| WO | 2012073014 | 6/2012 |
| WO | WO2014153979 | 10/2014 |

* cited by examiner

METHOD, APPARATUS, AND SYSTEM FOR OPERATING AN ELECTRONIC ACCOUNT IN CONNECTION WITH AN ELECTRONIC TRANSACTION

CROSS REFERENCE TO OTHER APPLICATIONS

This application claims priority to People's Republic of China Patent Application No. 201410205929.8 entitled A METHOD FOR OPERATING ELECTRONIC ACCOUNTS AND A METHOD AND A DEVICE FOR DISPLAYING PAYMENT PAGES, filed May 15, 2014 which is incorporated herein by reference for all purposes.

FIELD OF THE INVENTION

The present application relates to a field of computer technology. In particular, the present application relates to a method, a device, and a system for operating electronic accounts and to a method, a device, and a system for displaying payment pages.

BACKGROUND OF THE INVENTION

A user can use an electronic account to perform online shopping. FIG. 1A is a structural block diagram of a system for performing online shopping according to some related art. For example, FIG. 1A illustrates the devices that are generally used in connection with the user using the electronic account to perform online shopping. As illustrated in FIG. 1A, a client terminal 101, a merchant server 102, and a payment server 103 can be used in connection with the user using the electronic account to perform online shopping. The client terminal 101 can be an electronic device such as a computer or a mobile phone. The merchant server 102 can be a server affiliated (e.g., hosting) with a shopping website, and the payment server 103 can be a banking server or another server that has the authority to operate electronic accounts.

FIG. 1B is a flowchart of a method for a user to complete a single online purchase according to some related art.

Referring to FIG. 1B, a method for a user to complete a single online purchase is provided.

At 111, the client terminal 101 requests product information from the merchant server 102.

At 112, the merchant server 102 pushes product page information to the client terminal 101 so that a browser installed on the client terminal 101 can display a page containing various pieces of product information.

At 113, the user terminal 101 confirms the product information selected by the user from the page containing various pieces of product information and sends a selected product information to the merchant server 102.

The selected product information mentioned can be referred to as information on products that the user intends to buy.

At 114, in order for the user to use an electronic account to pay for the products which the user intends to buy (e.g., the selected product information), the merchant server 102 pushes a payment platform display page containing payment platform information to the client terminal 101 so as to cause the client terminal 101 to display a payment platform display page containing payment platform options.

According to some related art, the payment platform is "middleware" in the transaction process between a buyer and a seller. The payment platform is an independent mechanism which, under the supervision and control of a bank, safeguards the interests of both parties in a transaction. A single payment platform generally corresponds to at least one payment server. Payment platform options generally display the names of the payment platforms. For example, "Bank of China," "Citibank," or the name of a third party payment platform, and the like, are all names of payment platforms.

The third party payment platforms can correspond to a third party payment product such as Alipay, PayPal, Gopay, Tenpay, 0txw, Yeepay, 99bill, Baifubao, NetEase ePay, IPS, China PnR, or the like.

At 115, the client terminal 101 sends to the merchant server 102 payment platform information corresponding to the payment platform option selected by the user.

At 116, the merchant server 102 sends a payment request to a corresponding payment server (e.g., the payment server 103). For example, assuming that the payment platform indicated by the payment platform information sent by the client terminal 101 corresponds to the payment server 103, then the merchant server 102 sends a payment request to payment server 103.

The payment request can include the Internet Protocol (IP) address and Uniform/Universal Resource Locator (URL) of the client terminal 101. The URL includes information on the amount to be paid and the access address for the product information selected by the user.

At 117, payment server 103 uses the aforesaid URL contained in the payment request as a basis for accessing the merchant server 103 and acquiring payment due information and user selected product information. The payment server 103 thereupon pushes, in accordance with the IP address of the client terminal 101, a product page containing payment due information and user selected product information to the client terminal 101 so as to instruct the client terminal 101 to display this payment page.

According to some related art, the payment page displayed by the client terminal 101 generally includes a payment account number input box and a payment password input box in addition to containing payment due information and user selected product information.

At 118, the client terminal 101 obtains the payment account number entered by the user in the payment account number input box, and the client terminal 101 obtains the payment password in the payment password input box. Moreover, the client terminal 101 sends both the payment account number and payment password that the client terminal 101 obtained to the payment server 103.

At 119, the payment server 103 determines whether the payment account number and payment password sent by the client terminal 101 are correctly matched. If the result of the determination at 119 as to whether the payment account number and the payment password match indicates that the payment account number and the payment password are correctly matched, then the payment server 103 proceeds to 120. Otherwise, the method 150 for a user to complete a single online purchase can be terminated.

At 120, the payment server 103 looks up the electronic account matched with the payment account number sent by the client terminal 101 and performs a deduction operation on the corresponding electronic account. The payment server 103 deducts the same amount as the payment due amount described above.

At 121, the payment server 103 sends a notification of successful payment to the merchant server 102 to inform the merchant server 102 of the result of the current transaction.

At 122, the merchant server 102 sends a notification of successful payment to the client terminal 101, and the method 150 for a user to complete a single online purchase ends.

Although one can successfully operate an electronic account using the procedure shown above in FIG. 1B and thus use an electronic account to pay for a product, the method 150 has several deficiencies.

First, the payment server 103 needs to invoke a URL in order to cause the client terminal 101 to display a payment page. The process of invoking a URL uses a relatively long period of processing time. As a result, the client terminal 101 is required to wait for a relatively long time to complete the desired transaction. For example, the waiting time can begin with the display of the payment platform display page and end with the redirect to the display of the payment page. The waiting time lowers the overall efficiency of the payment process. Second, the method 150 requires that sensitive information (e.g., the payment password) from the user be transmitted to the payment server 103 and thus runs the risk of leaking sensitive information.

Therefore, there is a need for a method, device, and system for processing an online transaction that is efficient and that does not risk exposure of sensitive information.

BRIEF DESCRIPTION OF THE DRAWINGS

Various embodiments of the invention are disclosed in the following detailed description and the accompanying drawings.

The drawings described here are intended to further the understanding of the present application and form a part of this application. The illustrative embodiments of the present application and the descriptions thereof are intended to explain this application and do not constitute inappropriate limitation of the present application. Among the drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

Various embodiments of the present disclosure include a technique for operating electronic accounts that reduces the risk of leaking sensitive information and at the same time increases the efficiency of the payment process.

A device generally refers to a device used (e.g., by a user) within a network system and used to communicate with one or more servers. According to various embodiments of the present disclosure, a terminal may include communication functionality. For example, a device may be a smart phone, a tablet, a mobile phone, a video phone, an e-book reader, a desktop Personal Computer (PC), a laptop PC, a netbook PC, a Personal Digital Assistant (PDA), a Portable Multimedia Player (PMP), an mp3 player, a mobile device, a camera, a wearable device (e.g., a Head-Mounted Device (HMD), electronic clothes, electronic braces, an electronic necklace, an electronic accessory, an electronic tattoo, or a smart watch), or the like.

According to some embodiments of the present disclosure, a device includes a smart home appliance with communication functionality. A smart home appliance can be, for example, a television, a Digital Video Disk (DVD) player, an audio device, a refrigerator, an air conditioner, a vacuum cleaner, an oven, a microwave oven, a washer, a dryer, an air purifier, a set-top box, a TV box (e.g., Samsung HomeSync™, Apple TV™, or Google TV™), a gaming console, an electronic dictionary, an electronic key, a camcorder, an electronic picture frame, or the like.

According to various embodiments of the present disclosure, a device can be any combination of the foregoing devices. In addition, it will be apparent to one having ordinary skill in the art that a device according to various embodiments of the present disclosure is not limited to the foregoing devices.

In some embodiments, a terminal such as a client terminal can correspond to a device.

Figure 1A:
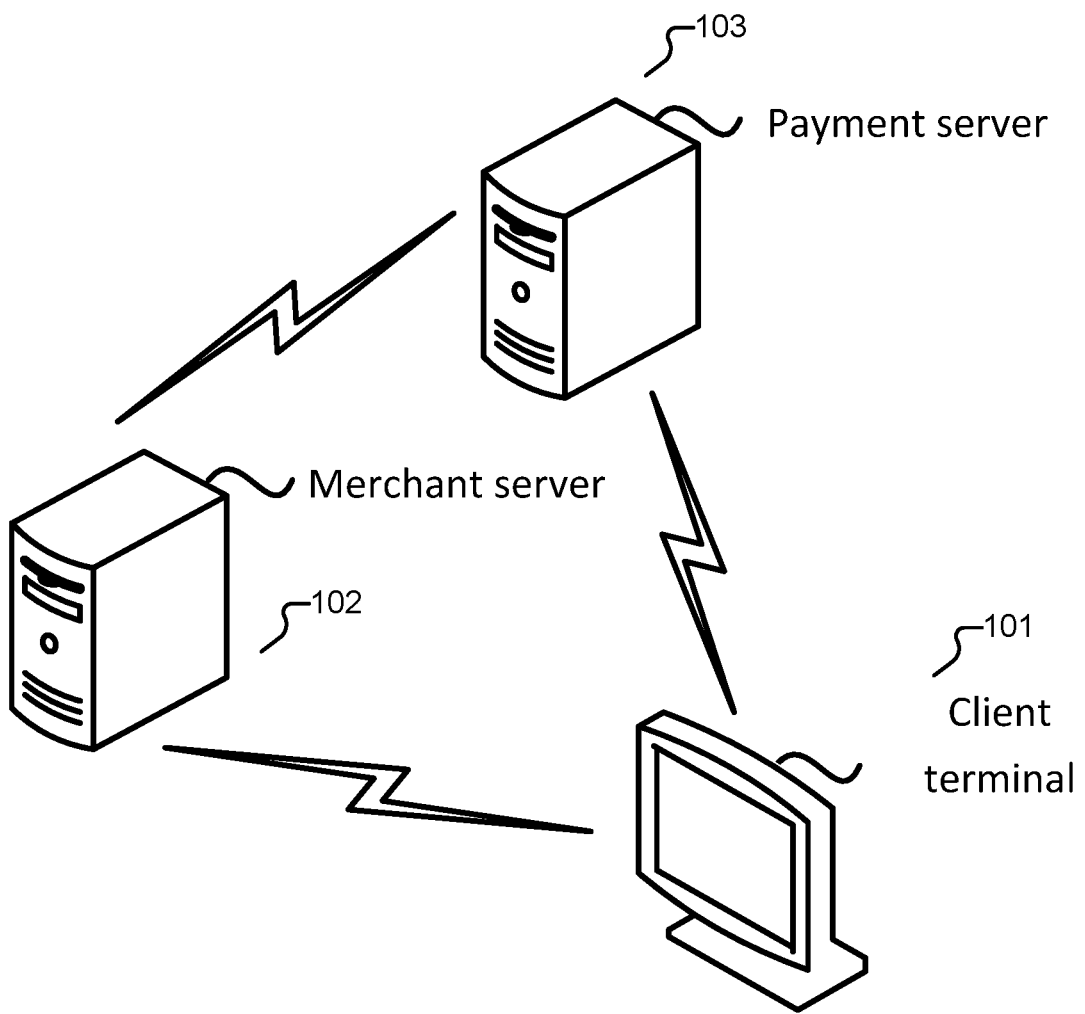
FIG. 1A is a structural block diagram of a system for performing online shopping according to some related art.
Figure 1B:
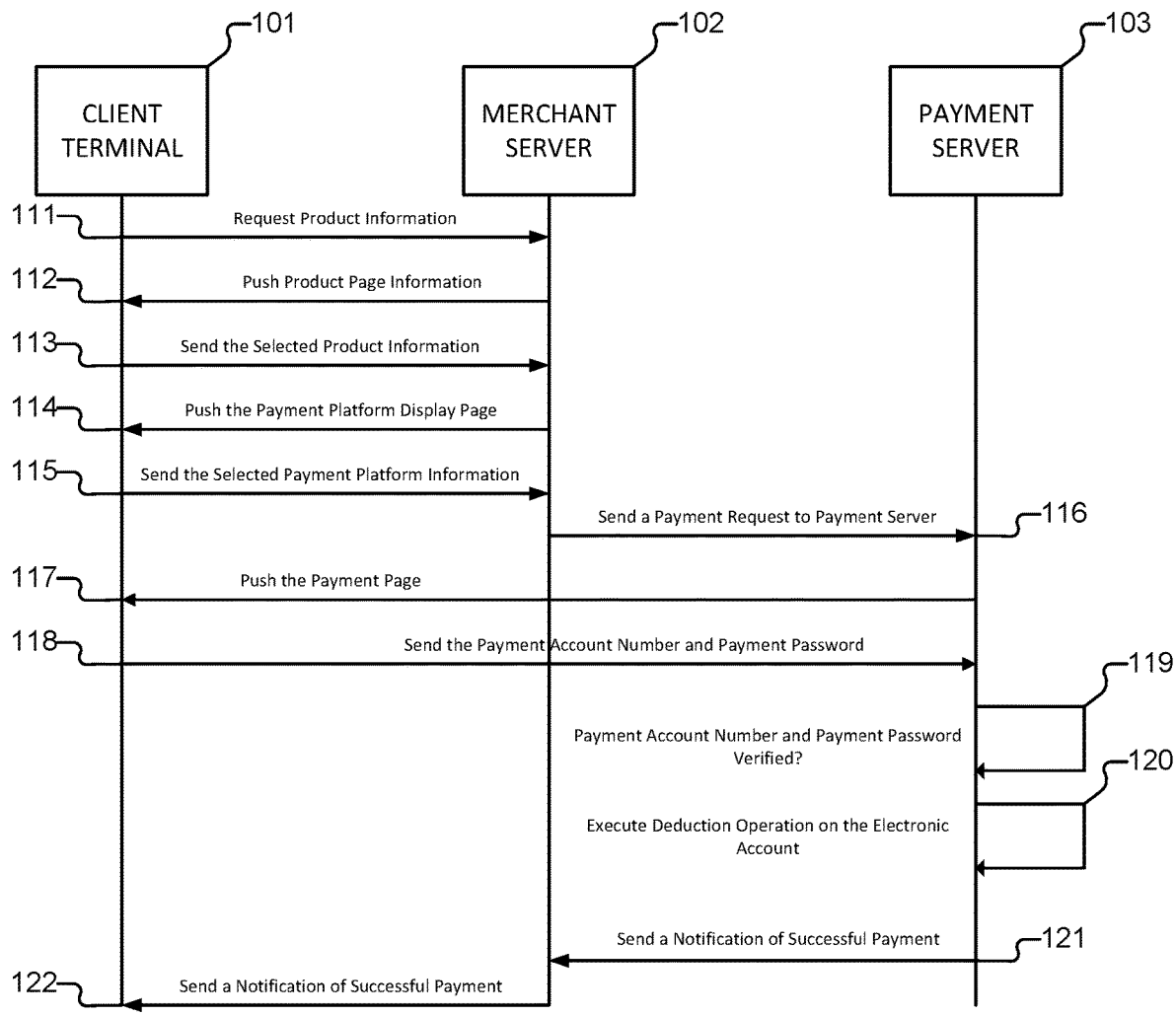
FIG. 1B is a flowchart of a method for a user to complete a single online purchase according to some related art.
Figure 2:
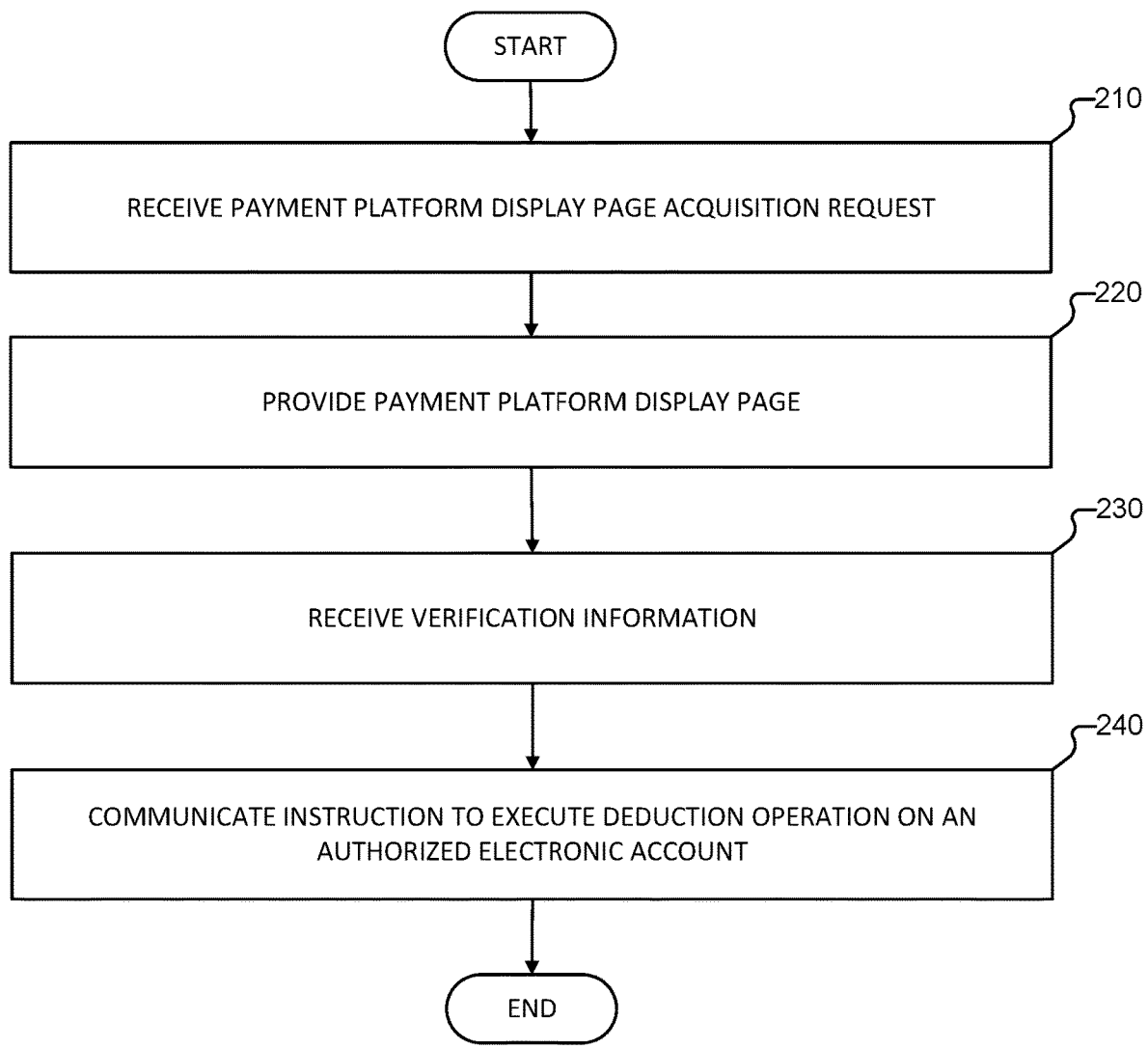
FIG. 2 is a flowchart of a method for operating an electronic account according to various embodiments of the present disclosure.

FIG. 2 is a flowchart of a method for operating an electronic account according to various embodiments of the present disclosure.

Referring to FIG. 2, a method 200 for operating an electronic account is provided. In some embodiments, process 200 can be implemented by device 700 of FIG. 7. In some embodiments, process 200 can be implemented by device 800 of FIG. 8. In some embodiments, process 200 can be implemented by device 900 of FIG. 9. In some embodiments, process 200 can be implemented by device 1000 of FIG. 10. In some embodiments, process 200 can be implemented by system 1300 of FIG. 13.

At 210, a payment platform display page acquisition request is received. In some embodiments, a merchant server receives the payment platform display page acquisition request. The merchant server can be a server affiliated with an electronic commerce website (e.g., a website on which goods or services can be purchased). For example, the merchant server can be a server that hosts an electronic commerce website. The merchant server can receive a payment platform display page acquisition request from a first client terminal. The first client terminal can send the payment platform display page acquisition request to the merchant server in connection with an online purchase. For example, the payment platform display page acquisition request can be sent in connection with a checkout process associated with the electronic commerce website, an electronic commerce server such as a service accessed through an application, or the like.

At 220, a payment platform display page is provided. In some embodiments, the merchant server provides the payment platform display page. For example, the merchant server can provide (e.g., send) the payment platform display page to the first client terminal in response to the merchant server receiving the payment platform display page acquisition request. A first script code can be embedded in the payment platform display page. In response to receiving the payment platform display page acquisition request, the merchant server can generate the first script code and generate, or otherwise configure, the payment platform display page to include the first script code.

In some embodiments, the payment platform display page can be configured to cause a recipient terminal (e.g., the first client terminal) to execute the first script code. For example, the payment platform display page can cause the first client terminal to execute the first script code in response to the first client terminal accessing the payment platform display page (e.g., when the first client terminal views the payment platform display page in a browser installed on the first client terminal). The first script code can be a program that accompanies an HTML page (e.g., the payment platform display page). The first script code can be JavaScript (JS) or the like. The file script code is configured to cause the first client terminal to acquire a payment page that includes a digital object unique identifier from a payment server and to display the payment page (e.g., in response to the first client terminal receiving the payment page). For example, the first script code can redirect the first client terminal to the payment server.

The payment server is a server that is affiliated with a financial institution, financial transaction processing service, or the like. For example, the payment server can be a banking server or another server that has the authority to operate electronic accounts. The payment server can debit and credit an electronic account.

In some embodiments, the first script code includes location information (e.g., the storage address) of a second script code at the payment server. The first client terminal can first execute the first script code and thereby acquire from the payment server the second script file code. The second script file code can be a program stored on the payment server or on a storage unit associated with the payment server. The second script file code can be JavaScript or the like.

The second script file code can be configured to cause the first client terminal to communicate payment information to the payment server. For example, the first client terminal executes the second script file code to send upcoming payment sum information to the payment server. In the event that the payment server receives the upcoming payment sum information (e.g., from the first client terminal), the payment server can generate a digital object unique identifier representing the upcoming payment sum associated with the upcoming payment sum information. Thus, the second script file code, in response to being executed by the first client terminal, triggers the payment server to generate the digital object unique identifier. The payment server can send the digital object unique identifier representing the upcoming payment sum to the first client terminal. For example, the payment server can send the digital object unique identifier in connection with a payment page. The payment page can include the digital object unique identifier. In the event that the first client terminal receives a payment page including the digital object unique identifier from the payment server, the first client terminal can display the payment page.

In some embodiments, the digital object unique identifier can, in addition to indicating the upcoming payment sum, indicate information of the product that is to be purchased. For example, the digital object unique identifier can include product information corresponding to a product that is associated with a transaction corresponding to the upcoming payment sum.

In some embodiments, the "upcoming payment sum" corresponds to information on the sum that is to be paid using an electronic account. The upcoming payment sum can be represented by a digital object unique identifier.

In some embodiments, the digital object unique identifier is associated with, or otherwise represents, the upcoming payment sum, product information, information on the seller of the product, any other appropriate information, or any combination thereof. The "digital object unique identifier" (DOUI) can be an identifier that uniquely identifies an electronic document. For example, the digital object unique identifier can be an identifier used by a digital document producer to uniquely identify an electronic document published by the digital document producer. DOUIs can be generated by a device such as the payment server using existing library functions and/or application programming interface (API) calls. In some embodiments, a DOUI encodes the upcoming payment sum as well as any other appropriate transaction information. Metadata associated with the digital object is stored in association with the digital object unique identifier name. The metadata can include a location, such as a URL, where the digital object can be found. The digital object unique identifier associated with a document remains fixed over the lifetime of the document. However, the location and other metadata can change. In some embodiments, the digital object unique identifier is a character string. Identifiers for many applications under various environments have been subsequently formed on the basis of the digital object unique identifier. In some embodiments, the digital object unique identifier corresponds to two-dimensional codes, barcodes, or the like.

In the event that a digital object unique identifier is a two-dimensional code, the payment server can send two-dimensional code to the first user terminal so that the first user terminal displays the two-dimensional code. A second client terminal can acquire the two-dimensional code from the first client terminal. In some embodiments, a second client terminal can scan, or otherwise receive, the two-dimensional code. For example, the second client can scan the two-dimensional code that is displayed by the first client terminal. In response to acquiring (e.g., scanning) the two-dimensional code from the first client terminal, the second client terminal can determine the upcoming payment sum information represented by the two-dimensional code.

In some embodiments, the second client terminal uses the two-dimensional code to confirm information associated with the transaction corresponding to the two-dimensional code (e.g., the transaction associated with the upcoming payment sum information represented by the two-dimensional code). For example, the second client terminal can extract transaction information, such as the upcoming payment sum information, from the two-dimensional code. The second client terminal can provide (e.g., display) transaction information, such as the upcoming payment sum information, to a user. The user can confirm the upcoming payment sum information. For example, the user can confirm that the transaction (e.g., the transaction corresponding to the two-dimensional code) is accurate or approved for payment.

The second client terminal can send confirmation of the transaction to the payment server. For example, in the event that the second client terminal receives confirmation of the transaction from the user, the second client terminal can send confirmation of the transaction (e.g., the upcoming payment sum information) to the payment server.

At 230, verification information is received. In some embodiments, the merchant server receives verification information. The payment server can send the verification information to the merchant server.

In some embodiments, the payment server can generate the verification information in response to receiving confirmation of the upcoming payment sum information from the second user terminal. For example, in the event that the user confirms the transaction (e.g., the upcoming payment sum information) on the second client terminal, the payment server can generate the verification information.

In some embodiments, after a second client terminal confirms the upcoming payment sum information indicated by the digital object unique identifier displayed by the first client terminal, the second client terminal uses a personal mobile financial service to authorize an electronic account to pay the upcoming payment sum, thereupon triggering the payment server to issue (e.g., generate) the verification information.

The verification information can be an electronic signature. The electronic signature can correspond to data which in electronic form is included in, or attached to, a datagram and is used to identify the signatory and to indicate that the signatory approves the content thereof. In some embodiments, the electronic signature includes payment server identity information and the upcoming payment sum information. In some embodiments, the electronic signature includes information on the product corresponding to the upcoming payment sum information, information on the seller of the product, information on an authorized electronic account, or the like.

At 240, an instruction to execute a deduction operation on an authorized electronic account is communicated. The verification information can be submitted by a user in connection with an instruction to execute the deduction operation on the authorized electronic account. The merchant server can send the instruction to execute the deduction operation on the authorized account to the payment server.

In some embodiments, the payment server is registered with the merchant server (e.g., the payment server's identification information is stored at a secure location on the merchant server). In response to the merchant server receiving an electronic signature including at least payment server identity information and the upcoming payment sum information, the merchant server can trigger the payment server to perform a deduction operation on the electronic account. The merchant server can trigger the payment server to perform a deduction operation on the electronic account by sending the electronic signature to the payment server.

A financial institution or the like can provide personal mobile financial services to a user. For example, the user can use a client terminal (e.g., a mobile terminal) to interface with the financial institution in connection with the providing of the personal mobile financial services.

In some embodiments, personal mobile financial services correspond to the linking of client terminal identifying information (e.g., cell phone numbers, or the like) with electronic accounts and providing mobile communication network users who own electronic accounts with convenient, personalized financial services and rapid payment channels anytime, anywhere through text messaging (e.g., Short Messaging Service (SMS) messages, Multimedia Messaging Service (MMS) messages), instant messages, or other such cell phone operations. The personal mobile financial services include account recharging, telephone recharging services, mobile phone lottery tickets, mobile phone donations, mobile phone shopping, and electronic account balance inquiries.

In an example in which a user uses a mobile terminal in connection with mobile phone shopping that makes use of a personal mobile financial service, a user, after confirming an upcoming payment sum, triggers (e.g., instructs) a mobile device to send to a mobile communications network side (e.g., the payment server) a verification code acquisition request including the upcoming payment sum, the mobile phone number, and an identifier (e.g., a bank card number) of an electronic account associated with the user's mobile phone number. The mobile communications network side can include the payment server. In response to the mobile phone receiving from the mobile communications network side a message (e.g., a short message) that includes the verification code and that was issued (e.g., generated) in response to verification of the upcoming payment sum, the mobile phone number, and the bank card number, the user can submit the verification code into a verification code input box of the payment platform display page and click the "OK" option to trigger the mobile device to send the verification code to the mobile communications network side. In response to receiving the verification code from the user (e.g., the mobile device corresponding to the second client terminal), the mobile communications network (e.g., the payment server) determines that execution of the upcoming payment using the electronic account indicated by the bank card number has been authorized. Thus, the mobile communications network side pushes an authorization response message indicating successful authorization to the mobile device. In response to receiving the authorization response message, the user can use the mobile device to request, or otherwise authorize, that the payment server perform a deduction operation on the electronic account. The process of authorizing the payment server to perform the deduction operation on the electronic account does not require the sending of sensitive information such as a payment password to the network. Accordingly, various embodiments lower the risk of a leak of sensitive information.

Figure 3:
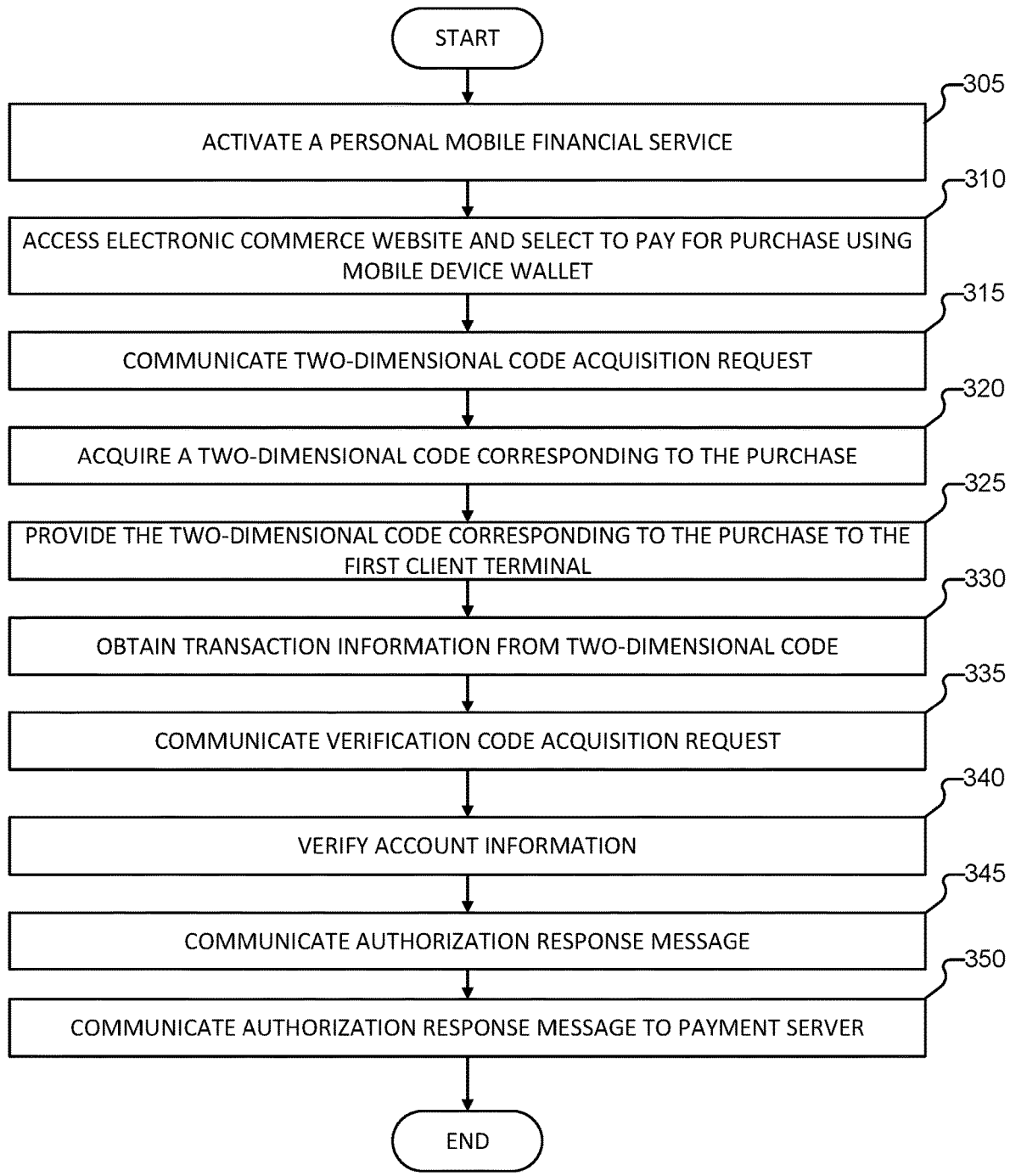
FIG. 3 is a flowchart of a method for using a personal mobile financial service to authorize an electronic account to pay an upcoming payment amount according to various embodiments of the present disclosure.

FIG. 3 is a flowchart of a method for using a personal mobile financial service to authorize an electronic account to pay an upcoming payment amount according to various embodiments of the present disclosure.

Referring to FIG. 3, a method 300 for using a personal mobile financial service to authorize an electronic account to pay an upcoming payment amount is provided. In some embodiments, process 300 can be implemented by device 700 of FIG. 7. In some embodiments, process 300 can be implemented by device 800 of FIG. 8. In some embodiments, process 300 can be implemented by device 900 of FIG. 9. In some embodiments, process 300 can be implemented by device 1000 of FIG. 10. In some embodiments, process 300 can be implemented by system 1300 of FIG. 13.

At 305, a personal mobile financial service is activated. For example, a user activates a personal mobile financial service that links a second client terminal (e.g., mobile device) to a bank card number. The user can register an account with a personal mobile financial service.

At 310, a purchase is initiated over a network. For example, a user can use a client terminal to purchase a product or service. In some embodiments, a user uses the first client terminal to access an electronic commerce website to select the product that the user wishes to purchase, and selects to pay for the purchase using a mobile device wallet. For example, the user can click the "Use mobile phone wallet to pay" option provided by the electronic commerce website.

At 315, a two-dimensional code acquisition request is communicated. In some embodiments, the first client terminal sends a two-dimensional code acquisition request to the payment server. The two-dimensional code acquisition request includes transaction information, such as the upcoming payment sum information.

At 320, a two-dimensional code is acquired. In some embodiments, the first client terminal receives the two-dimensional code from the payment server. The two-dimensional code corresponds to the transaction (e.g., the purchase from the electronic commerce website). In some embodiments, the payment server uses the upcoming payment sum information included in the two-dimensional code acquisition request to generate, or otherwise acquire, two-dimensional code information including upcoming payment sum information. In the event that the payment server has generated, or otherwise acquired, the two-dimensional code information, the payment server sends the two-dimensional code information (e.g., the two-dimensional code) to the first client terminal. The payment server can send the two-dimensional code information to the first client terminal by including the two-dimensional code information in a web page, an application, an email, a text message (e.g., an SMS message, an MMS message), the like, or any combination thereof.

At 325, a two-dimensional code information is provided. In some embodiments, the second client terminal receives the two-dimensional code from the first client terminal. The first client terminal receives the two-dimensional code from the payment server, extracts the two-dimensional code from the received two-dimensional code information, and provides the two-dimensional code to the user (e.g., to the second client terminal). In the event that the first client terminal receives the two-dimensional code information, the first client terminal can provide the two-dimensional code to the user (e.g., to the second client terminal). In some embodiments, the first client terminal displays a two-dimensional code according to the received two-dimensional code information. The first client terminal can send the two-dimensional code to the second client terminal. For example, the first client terminal can send the two-dimensional code to the second client terminal over a wired or wireless connection. The wireless connection can correspond to a Bluetooth connection, a WiFi connection, a Near Field Communication (NFC) connection, an infrared connection, the like, or any combination thereof.

At 330, transaction information is obtained from the two-dimensional code. In some embodiments, the second client terminal receives the two-dimensional code from the first client terminal. For example, in the event that the first client terminal displays the two-dimensional code, the second client terminal can scan, or otherwise capture, the two-dimensional code displayed by the first client terminal. In some embodiments, transaction information (e.g., upcoming payment sum information) can be obtained from the two-dimensional code. For example, the second client terminal can process the two-dimensional code to obtain a string comprising the upcoming payment sum and thereby obtain (e.g., extract) the upcoming payment sum information from the two-dimensional code.

At 335, a verification code acquisition request is communicated. In some embodiments, the second client terminal can send the verification code acquisition request to the mobile communications network. For example, the second client terminal can send the verification code acquisition request to the payment server. In some embodiments, the verification code acquisition request includes the upcoming payment sum, the mobile phone number (e.g., of the second client terminal), a bank card number associated with the mobile phone number, an account associated with the mobile phone number, the like, or any combination thereof.

At 340, account information is verified. In some embodiments, a mobile communications network side (e.g., the payment server) verifies the association between the mobile phone number and the bank card number (or other account information). For example, in response to receiving the verification code acquisition request, the payment server can extract information from the verification code acquisition request that is used to verify account information (e.g., the mobile phone number and the bank card number). The mobile communications network side can verify the upcoming payment sum. In some embodiments, in the event that the upcoming payment sum exceeds a threshold value associated with a permissible payment amount, the upcoming payment sum will fail verification. In some embodiments, in the event that the upcoming payment does not exceed the threshold value associated with the permissible payment amount, the upcoming payment sum will pass verification. The threshold value associated with the permissible payment amount can be configured by a user (e.g., according to user preferences), by a financial institution (e.g., the financial institution associated with the account), a payment processing service, the like, or any combination thereof.

At 345, an authorization response message is communicated. The authorization response message can be communicated from the mobile communications network side (e.g., payment server) to the second client terminal. The authorization response message can be configured according to whether the account information is verified at 340. For example, the authorization response message can be sent to the second client terminal only if the account information is verified. After the mobile communications network side verifies the upcoming payment sum and the above-described link between the mobile phone number and the bank card number, the mobile communications network side sends to the second client terminal an authorization response message indicating that the transaction is to be completed using the transaction information (e.g., information included in the verification code acquisition request). For example, the authorization response message can indicate that "payment for the upcoming payment sum is to be made from the electronic account indicated by the authorized bank card number." In some embodiments, in the event that the account information is not verified (e.g., if verification of the account information fails), the authorization response message can be configured to indicate that verification failed.

At 350, an authorization response message is communicated to the payment server. In some embodiments, the second client terminal sends an authorization response message to the payment server to inform the payment server that a deduction operation can be performed on the electronic account associated with the bank card number. The authorization response message sent by the second client terminal to the payment server can correspond to a confirmation to complete the transaction (e.g., payment) using the corresponding transaction information (e.g., information included in the verification code acquisition request). In response to the payment server receiving the authorization response message from the second client terminal, the payment server can issue the verification information described in connection with 230 of process 200 of FIG. 2. For example, the payment server can send the verification information to the merchant server. In some embodiments, the authorization response message communicated at 345 can be the same as the authorization response message communicated at 350.

Returning to 240 of FIG. 2, the merchant server can send the received verification information to the payment server to instruct the payment server to execute a deduction operation on the authorized electronic account.

According to various embodiments of the present disclosure, the communication of the received verification information in connection with instructing the payment server to execute the deduction operation on the authorized electronic account can be implemented according to various processes.

In some embodiments, the verification information includes electronic account information and upcoming payment sum information. In the event the payment server receives the verification information, the payment server can execute a deduction operation on the electronic account according to the electronic account information and upcoming payment sum information included in the verification information.

In some embodiments, the verification information includes a transaction serial number that is generated by the payment server when the transaction is initiated, and an authorization notification includes the transaction serial number, electronic account information, and upcoming payment sum information. The verification information and the authorization notification can be associated according to the corresponding transaction serial number. For example, the payment server can identify corresponding verification information and authorization notification according to matching transaction serial numbers respectively included therein. The payment server can store a mapping of verification information to a corresponding authorization notification.

In some embodiments, the payment server can use the transaction serial number, electronic account information, and upcoming payment sum information included in the authorization notification to establish mapping relationships between transaction serial numbers, electronic account information, and upcoming payment sum information, the like, or any combination thereof.

In the event that the payment server receives the verification information sent by the merchant server, the payment server can use the mapping relationships of transaction serial numbers, electronic account information, and upcoming payment sum information to acquire the transaction serial number included in the verification information received from the merchant server. The payment server can use the mapping relationships of transaction serial numbers, electronic account information, and upcoming payment sum information to look up the electronic account information and upcoming payment sum information which are mapped from the transaction serial number.

In the event that the payment server receives the verification information, the payment server can perform a deduction operation on an electronic account using the electronic account information and upcoming payment sum information which are mapped from the transaction serial number. For example, the payment server performs a deduction operation on the electronic account according to the electronic account information and the upcoming payment sum information that were looked up in connection with the transaction serial number included in the verification information.

In some embodiments, the electronic account associated with a deduction operation is determined according to information sent by the second client terminal. For example, in the event that the second client terminal uses a personal mobile financial service to authorize an electronic account to pay the upcoming payment sum, the electronic account information can be carried in the authorization notification or in another message sent to the payment server.

Various embodiments of the present disclosure provide a method, an apparatus, and a system according to which a client terminal can use a personal mobile financial service to authorize an electronic account to pay an upcoming payment sum, such that the authorization process does not require transmission of sensitive information such as a payment password or the like. Therefore, the authorization process can reduce the risk of leaks of sensitive information. Additionally, because the authorization process to authorize an electronic account to pay an upcoming payment sum according to various embodiments requires only that the user execute a script file code embedded in a payment platform display page, acquiring the display page from the payment server displaying the page without the payment server having to invoke a URL is relatively simple. As a result, the payment process according to various embodiments is efficient. In some embodiments, the payment process uses the verification message sent by the merchant server as a trigger condition for executing the deduction operation on the electronic account. Thus, in some embodiments, the merchant server can actively control the timing of the deduction operation performed on the electronic account.

In some embodiments, 210-240 of process 200 illustrated in FIG. 2 can be implemented by a merchant server. In some embodiments, 210-240 of process 200 can be implemented by the same merchant server. In some embodiments, 210 and 220 of process 200 can be implemented by a first merchant server, and 230 and 240 of process 200 can be implemented by a second merchant server. The first merchant server and the second merchant server can be different merchant servers. In some embodiments, various other devices can implement any of 210-240 of process 200. In some embodiments, the first client terminal and the second client terminal described in connection with process 200 and process 300 can be implemented by the same client terminal.

Various embodiments provide a method, an apparatus, and a system for operating electronic accounts. The electronic accounts can be operated or managed to reduce the risk of leaking sensitive information while also increasing the efficiency of the payment process.

Figure 4:
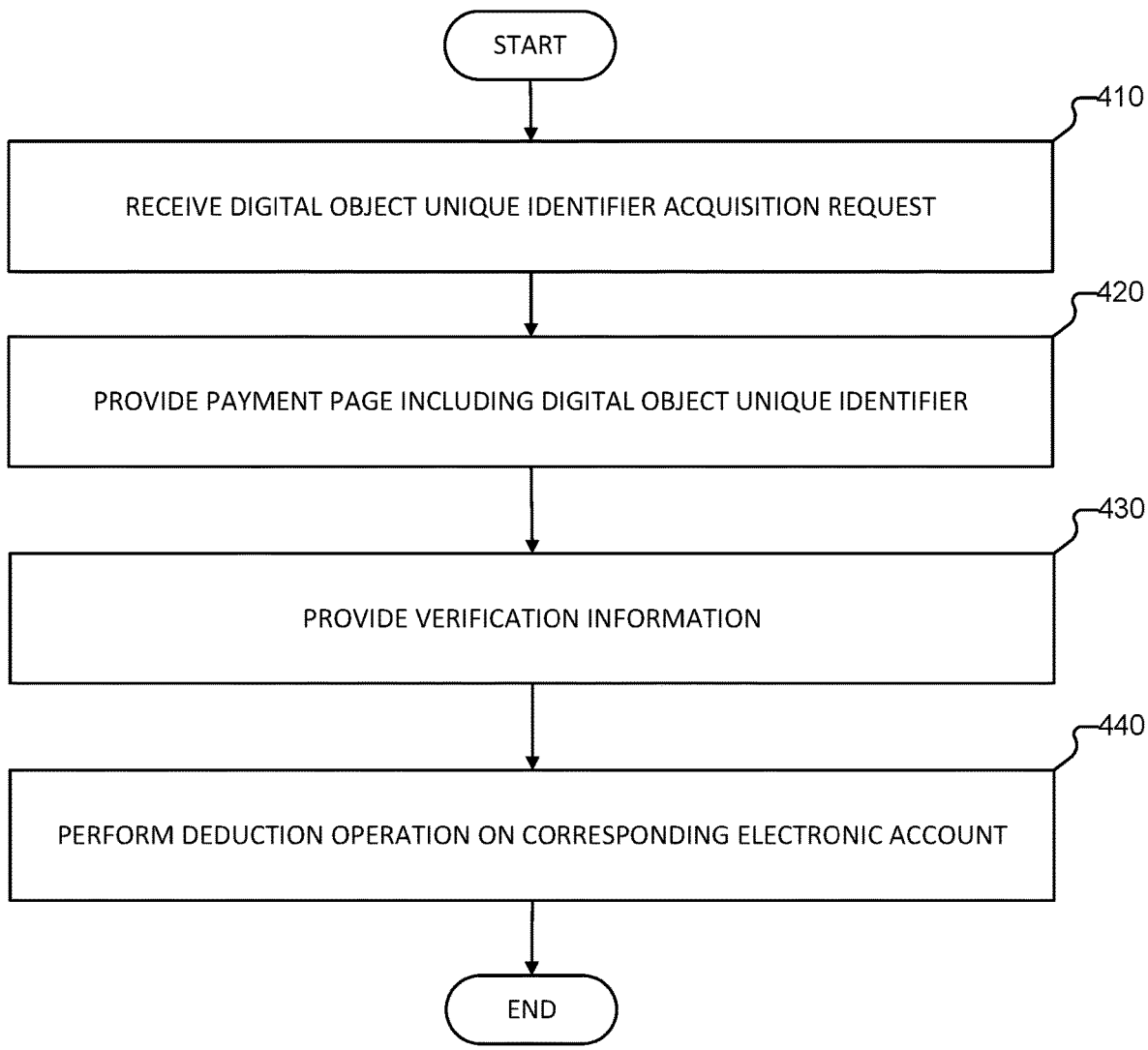
FIG. 4 is a flowchart of a method for operating an electronic account according to various embodiments of the present disclosure.

FIG. 4 is a flowchart of a method for operating an electronic account according to various embodiments of the present disclosure.

Referring to FIG. 4, a method 400 for operating an electronic account is provided. In some embodiments, process 400 can be implemented by device 700 of FIG. 7. In some embodiments, process 400 can be implemented by device 800 of FIG. 8. In some embodiments, process 400 can be implemented by device 900 of FIG. 9. In some embodiments, process 400 can be implemented by device 1000 of FIG. 10. In some embodiments, process 400 can be implemented by system 1300 of FIG. 13.

At 410, a digital object unique identifier acquisition request is received. In some embodiments, a payment server receives the payment platform display page acquisition request. The payment server is a server that is affiliated with a financial institution, financial transaction processing service, or the like. For example, the payment server can be a banking server or another server that is connected to a bank's account database and has the authority to operate electronic accounts. The payment server is configured to receive the digital object unique identifier acquisition request sent by a first client terminal.

In some embodiments, the digital object unique identifier acquisition request is sent by the first client terminal in connection with the execution of a first script code embedded in a payment platform display page. For example, in the event the first client terminal receives and displays a payment platform display page in connection with an online purchase, and the payment platform display page that is embedded therein, the first client terminal can be caused to execute the first script code, which causes the first client terminal to send, to the payment server, the digital object unique identifier acquisition request. The first script code can be a program that accompanies an HTML page (e.g., the payment platform display page). The first script code can be JavaScript or the like.

In some embodiments, the first client terminal can send a code acquisition request to a payment server by executing the first script code. In the event that the payment server receives the code acquisition request from the first client terminal, the payment server can provide the first client terminal with a second script file code. In the event that the first client terminal receives the second script file code (e.g., from the payment server), the first client terminal can execute the second script file code. In the event that the first client terminal executes the second script file code, the first user terminal can send a digital object unique identifier acquisition request to the payment server. For example, the second script file code can cause the first client terminal to send a digital object unique identifier acquisition request to the payment server.

At 420, a payment page including the digital object unique identifier is provided. In some embodiments, the payment server provides the first client terminal with a payment page including the digital object unique identifier. The payment page can be an HTML page, a page for an application installed on the first client terminal, or the like.

In some embodiments, the digital object unique identifier indicates the upcoming payment sum. The digital object unique identifier can include other transaction information associated with an online transaction (e.g., product information associated with a purchase from an electronic commerce website, identification information of an electronic commerce server such as a service accessed through an application, or the like).

At 430, verification information is provided. In some embodiments, the payment server provides the verification information to a merchant server. For example, the payment server can send the verification information in response to the payment server receiving the authorization notification. The authorization notification can be sent to the payment server by a second client terminal.

In some embodiments, the first client terminal can display the digital object unique identifier or information included therein to a user of the first client terminal. For example, the first client terminal can extract the upcoming payment sum included in the digital object unique identifier. The second client terminal can acquire the upcoming payment sum or confirmation of the upcoming payment sum. For example, the second client terminal can capture the digital object unique identifier or the information included in the digital object unique identifier. The second client terminal can capture the digital object unique identifier or the information included in the digital object unique identifier using image capture, or via a user manually entering the information. The second client terminal can provide an interface through which a user can confirm the upcoming payment sum. In the event that the second client terminal confirms the upcoming payment sum indicated by the digital object unique identifier displayed by the first user terminal, the second client terminal can use a personal mobile financial service to authorize an electronic account to pay the upcoming payment sum and thereupon send the authorization notification.

At 440, a deduction operation is performed on a corresponding electronic account. The payment server can perform the deduction operation on the electronic account. For example, in response to receiving the verification information sent by the merchant server, the payment server can execute a deduction operation on the electronic account associated with the verification information.

In some embodiments, the verification information includes electronic account information and upcoming payment sum information. The merchant server can send the verification information to the payment server. For example, the merchant server can send the verification information to the payment server to instruct the payment server to execute a deduction operation on the electronic account according to the electronic account information and the upcoming payment sum information included in the verification information.

In some embodiments, the verification information includes a transaction serial number. The merchant server can send the verification information to the payment server. In the event that the payment server receives the verification information, the payment server can search for the electronic account information and the upcoming payment sum information corresponding to information included in the verification information. For example, the merchant server can send the verification information to the payment server to instruct the payment server to use pre-established mapping relationships between the transaction serial number, the electronic account information, and the upcoming payment sum information to look up the electronic account information and the upcoming payment sum information mapped from the transaction serial number included in the verification information, and to execute a deduction operation on the electronic account according to the electronic account information and the upcoming payment sum information that were looked up.

Various embodiments of the present disclosure use a personal mobile financial service to authorize an electronic account to pay an upcoming payment sum such that transmission of sensitive information is not required in order to complete authorization to pay the upcoming payment sum. Therefore, the authorization can reduce the risk that sensitive information will be leaked. Additionally, because the authorization process to authorize an electronic account to pay an upcoming payment sum according to various embodiments requires only that the user execute a script file code embedded in a payment platform display page, acquiring the display page from the payment server and displaying the page without the payment server having to invoke a URL is relatively simple. As a result, the payment process according to various embodiments is relatively simple.

In some embodiments, 410-440 of process 400 illustrated in FIG. 4 can be implemented by a payment server. In some embodiments, 410-440 of process 400 can be implemented by the same payment server. In some embodiments, 410 of process 400 can be implemented by a first payment server, and 420-440 of process 400 can be implemented by a second payment server. The first payment server and the second payment server can be different payment servers. In some embodiments, various other devices can implement any of 410-440 of process 400. In some embodiments, the first client terminal and the second client terminal described in connection with process 400 can be implemented by the same client terminal.

Figure 5:
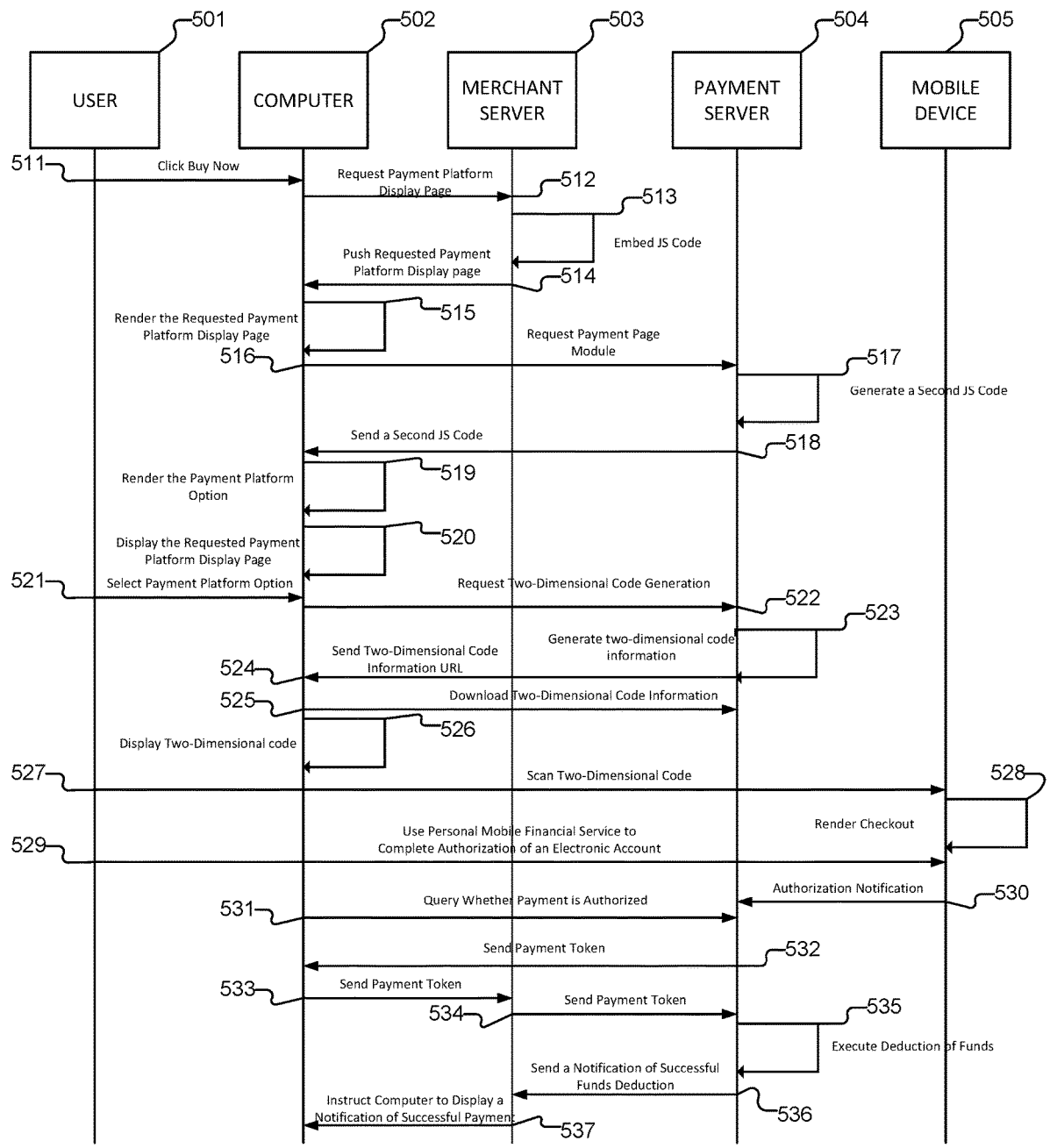
FIG. 5 is a flowchart of a method for operating an electronic account according to various embodiments of the present disclosure.

FIG. 5 is a flowchart of a method for operating an electronic account according to various embodiments of the present disclosure.

Referring to FIG. 5, a method 500 for operating an electronic account is provided. In some embodiments, process 500 can be implemented by device 700 of FIG. 7. In some embodiments, process 500 can be implemented by device 800 of FIG. 8. In some embodiments, process 500 can be implemented by device 900 of FIG. 9. In some embodiments, process 500 can be implemented by device 1000 of FIG. 10. In some embodiments, process 500 can be implemented by system 1300 of FIG. 13.

At 511, a user 501 selects to complete an electronic purchase on a first client terminal 502 (e.g., a personal computer). The user 501 can select to complete the electronic purchase on a website in a browser installed on the first client terminal 502. The user 501 can select to complete the electronic purchase in an application installed on the first client terminal 502. The electronic purchase can relate to a purchase of a product or service offered for sale by an electronic commerce website, electronic commerce service, or the like. In the event that the user 501 selects the product that the user 501 intends to buy, the user can select to complete the electronic purchase of the product. For example, the user 501 can click a "Buy Now" in connection with the electronic purchase. In the event that the user 501 selects to complete the electronic purchase, the first client terminal 502 can be instructed to open (e.g., navigate to) a payment platform display page.

At 512, a request for a payment platform display page is communicated. In some embodiments, the first client terminal 502 sends a request for the payment platform display page to a merchant server 503. The first client terminal 502 can request the payment platform display page from the merchant server 503 in response to the user 501 selecting to complete the electronic purchase. The merchant server 503 can be a server affiliated with an electronic commerce website (e.g., a website on which goods or services can be purchased). For example, the merchant server 503 can be a server that hosts an electronic commerce website, electronic commerce service, or the like. In some embodiments, the request is sent as an HTTP GET message directed to the URL of the payment platform display page. In some embodiments, the request for the payment platform display page is communicated using a proprietary protocol. HTTP-based communication is described below for purposes of example although other protocols can be used.

At 513, a first script code is embedded in a payment platform display page. In some embodiments, the merchant server 503 embeds the first script code in the payment platform display page. The first script code can be JS or the like. In some embodiments, the merchant server 503 determines the payment platform display page including upcoming payment sum information and information on the product that is to be purchased and embeds a piece of JS code in the payment platform display page. The merchant server 503 can configure the first script code (e.g., the JS code) using transaction information. For example, the merchant server 503 can configure the script code using transaction information associated with the request for the payment platform display page. The transaction information can include the upcoming payment sum information, product information, seller information, the like, or any combination thereof.

JS is a language that can be embedded in an HTML page. For example, JS code (e.g., the first script code) can be embedded in the payment platform display page data. In the event that the JS code is embedded in the payment platform display page data, the JS code is invoked by the browser (or the application) to interact with the web page client (e.g., in response to the payment platform display page being accessed by the corresponding browser or other application on a client terminal).

In some embodiments, the first script code (e.g., the piece of JS code) includes a payment server address associated with a payment server 504. In the event that the first script code is executed, the first client terminal 502 is triggered (e.g., caused by the script code to execute) to send a payment page module acquisition request to the payment server indicated by the payment server address. For example, the first script code can redirect the browser or application of the first client terminal 502 to the payment server address. The payment page module associated with the payment page module acquisition request can correspond to a function module implemented by software.

At 514, a payment platform display page is communicated. In some embodiments, the merchant server 503 communicates the payment platform display page to the first client terminal 502. In some embodiments, the merchant server 503 pushes the requested payment platform display page to the first client computer in response to receiving the request for a payment platform display page. The payment platform display page can have the first script code embedded therein.

At 515, the payment platform display page is displayed. In some embodiments, in response to receiving the payment platform display page, the first client terminal 502 renders the payment platform display page in the browser. The browser of first client terminal 502 can execute the first script code embedded in the payment platform display page in connection with the rendering of the payment platform display page.

At 516, a request for a payment page module is communicated. For example, the first client terminal 502 can send a payment page module acquisition request to a payment server 504 indicated by the payment server address included in the first script code. The first client terminal 502 can send the payment page module acquisition request to the payment server 504 in response to the first client terminal 502 executing the first script code.

In some embodiments, 515 and 516 of process 500 are executed asynchronously.

At 517, a second script code is generated. In some embodiments, the payment server 504 generates the second script code. For example, the payment server 504 can generate the second script code in response to receiving the request for the payment page module. The second script code can be JS or the like.

In some embodiments, the second script code generated by the payment server 504 implements the payment page module functions.

At 518, the second script code is communicated. In some embodiments, the payment server 504 sends the second script code to the first client terminal 502.

At 519, a payment platform option can be rendered. In some embodiments, the second script code causes the payment platform option to be rendered. For example, in the event that the first client terminal 502 executes the second script code, the first client terminal 502 renders payment platform options on the payment platform display page. The payment platform option rendered in connection with executing the second script code can correspond to a payment platform associated with the payment server 504 (e.g., the payment server that generated the second script code).

For example, if the name of the payment platform corresponding to the payment server 504 is "Alipay," the first client terminal 502 can render the payment platform option "Alipay" in connection with executing the second script code.

At 520, the payment platform display page is displayed. In some embodiments, the requested payment platform display page is displayed by the first client terminal 502. For example, the first client terminal 502 can display the payment platform display page including the payment platform options.

At 521, a payment platform option is selected. In some embodiments, the payment platform option is selected by the user 501. The user 501 can input the selection to the first client terminal 502. For example, the user 501 can click a payment platform option displayed on the payment platform display page.

At 522, a request for generation of a two-dimensional code is communicated. In some embodiments, the first client terminal 502 communicates a two-dimensional code generation request in response to selection of the payment platform option. For example, by executing the second JS code, the first client terminal 502 sends a two-dimensional code generation request to the payment server 504 corresponding to the payment platform option selected (e.g., clicked) by the user 501.

In some embodiments, the two-dimensional code generation request includes upcoming payment sum information and information on the product to be purchased.

At 523, two-dimensional code information is generated. In some embodiments, in the event that the payment server 504 receives the two-dimensional code information, the payment server 504 generates the two-dimensional code information. The payment server 504 can generate the two-dimensional code information according to the upcoming payment sum information and information on the product to be purchased included in the two-dimensional generation request.

In some embodiments, the generated two-dimensional code information includes upcoming payment sum information, information on the product to be purchased, and information used to render a page associated with completing an electronic purchase. For example, the information used to render a page associated with completing an electronic purchase can include information used to render a "Checkout." The "Checkout" can correspond to a page including a "Confirm Payment" option. The two-dimensional code information can include a two-dimensional code. The two-dimensional code can include the upcoming payment sum information, the information on the product to be purchased, and the information used to render a page associated with completing an electronic purchase.

At 524, a two-dimensional code information address is communicated. In some embodiments, the payment server 504 sends the two-dimensional code information address to the first client terminal 502. The two-dimensional code information address can correspond to a URL at which the two-dimensional code information can be accessed, or otherwise retrieved. The payment server 504 can send the generated two-dimensional code information address (e.g., URL) to the first client terminal 502 in response to the payment server 504 receiving the two-dimensional code generation request.

At 525, the two dimensional code information is acquired. In some embodiments, the two-dimensional code information is acquired (e.g., downloaded) from the two-dimensional code information address. For example, the first client terminal 502 can download the two-dimensional code information from the two-dimensional code information address. The client terminal 502 can download the two-dimensional code information from the payment server 504 according to the two-dimensional code information URL in connection with executing the second script code. For example, the second script code can cause the first client terminal 502 to automatically download the two-dimensional code information.

At 526, a two-dimensional code is displayed. In some embodiments, the first client terminal 502 displays the two-dimensional code. The first client terminal 502 can extract, or otherwise acquire, the two-dimensional code from the two-dimensional code information that is downloaded from the two-dimensional code information address.

At 527, the two-dimensional code is acquired. In some embodiments, the user 501 acquires the two-dimensional code from the first client terminal 502. For example, the user 501 can use a second client terminal 505 (e.g., a mobile phone) to scan the two-dimensional code displayed by the first client terminal 502. The second client terminal 505 can scan the two-dimensional code using an image capture function (e.g., a camera function of the mobile device). In some embodiments, the user 501 can manually input information included in the two-dimensional code to the second client terminal 505. In some embodiments, the two-dimensional code can be provided to the user 501 (via the second client terminal 505) over a wired or wireless connection rather than via a display. The second client terminal 505 can extract, from the two-dimensional code, the upcoming payment sum information, the information on the product to be purchased, and the information used to render a page associated with completing an electronic purchase. For example, the second client terminal 505 can obtain the upcoming payment sum information, the information on the product to be purchased, and information for rendering a "Checkout."

At 528, information associated with completing an electronic purchase is rendered. In some embodiments, the second client terminal 505 renders a page associated with completing an electronic purchase. For example, the second client terminal 505 can use the upcoming payment sum information, the information on the product to be purchased, and the information for rendering a "Checkout" as a basis to display a page including the upcoming payment sum, the information on the product to be purchased, and information associated with confirmation of a payment (e.g., a "Confirm Payment" option). The information associated with confirmation of a payment included in the page can be an interface through which the user 501 can confirm payment in connection with the purchase of the product to be purchased. The page can be displayed in a browser, an application, or the like installed on the second client terminal 505.

At 529, the payment in connection with the purchase of the product to be purchased is confirmed. In some embodiments, the user 501 can input confirmation of the payment through the page displayed on the second client terminal 505. After confirming that the upcoming payment sum and the information on the product to be purchased are free of error, the user 501 can select (e.g., click) the "Confirm Payment" option. In the event that the user 501 confirms the payment (e.g., the user 501 selects the "Confirm Payment" option), the second client terminal 505 can send a verification code request to the mobile communications network side (e.g., the payment server, an authentication server, or the like). The verification code request can include the upcoming payment sum, the phone number of the second client terminal 505, and a bank card number associated with the phone number. In the event that the mobile communications network side verifies the upcoming payment sum and the association between the mobile phone number and the bank card number, the mobile communications network side pushes a verification code to the second client terminal 505. The user 501 can input the verification code into the second client terminal 505. The mobile communication network side (e.g., the payment server 504) can push the verification code to the second client terminal 502 via a Short Message Service (SMS) message. In response to receiving the SMS (on the second client terminal 502), the user can input the verification code into the second client terminal 502. In the event that the user 501 inputs the verification code into the second client terminal 505, the second client terminal 505 can send the verification code to the mobile communications network side. In response to receiving the verification code, the mobile communications side can send an authorization response message to the second client terminal 505. The authorization response message can indicate that the authorization was successful.

At 530, an authorization notification is communicated. In some embodiments, the second client terminal 505 sends the authorization notification to the payment server 504. The authorization notification can include information associated with the authorized electronic account. For example, the authorization notification can include the electronic account information indicated by the bank card number.

At 531, the payment server 503 is queried as to whether the transaction is authorized. In some embodiments, the first client terminal 502 can query the payment server 504 as to whether the upcoming payment sum has been authorized for payment. In some embodiments, the user 501 can manually control the first client terminal 502 to query the payment server 504. The first client terminal 502 can automatically query the payment server 504 at predetermined intervals. For example, by executing the second script code, the first client terminal 502 can periodically query the payment server 504 on whether the upcoming payment sum has been authorized for payment.

In some embodiments, the two-dimensional information generated by the payment server 504 can include a transaction serial number. The transaction serial number can be associated with the upcoming payment sum information and the information on the product to be purchased, and the transaction serial number can be used to uniquely identify the transaction. The verification acquisition request, the authorization response message, and the authorization notification all can include the transaction serial number.

In some embodiments, the first client terminal 502 can use the transaction serial number as a basis for querying whether the upcoming payment sum has been authorized for payment. For example, the first client terminal 502 can send a query request including the transaction serial number to the payment server 504 to trigger the payment server 504 to determine whether an authorization notification including the transaction serial number has been received. In the event that the payment server 504 determines that the authorization notification including the transaction serial number has been received, then payment server 504 can send an indication that the transaction is authorized to the first client terminal 502. Accordingly, the first client terminal 502 can determine that the upcoming payment sum has been authorized for payment. In the event that the payment server 504 does not provide an indication that the transaction is authorized to the first client terminal 502, the first client terminal 502 determines that the upcoming payment sum has not been authorized for payment.

At 532, a payment token is communicated. In some embodiments, the payment server 504 sends the payment token to the first client terminal 502. In the event that the payment server 504 confirms that the upcoming payment sum has been authorized for payment, the payment server 504 can send a payment token to the first client terminal 502.

In some embodiments, the payment token is a unique token (e.g., an alphanumeric string). For example, the payment token can be one kind of the verification information. In some embodiments, the payment token includes an electronic signature and transaction serial number from the payment server 504. The payment token can be generated by the payment server 504. The payment token can include an electronic signature of the payment server 504.

In some embodiments, the payment server 504 can locally establish mapping relationships between the transaction serial number, upcoming payment sum information, and information on the authorized electronic account after confirming that the upcoming payment sum has been authorized for payment.

At 533, the payment token is communicated to the merchant server 503. The first client terminal 502 can send the payment token to the merchant server 503.

At 534, the payment token is communicated to the payment server 504. The merchant server 503 can send the payment token to the payment server 504 in connection with receiving payment for the electronic purchase. For example, the merchant server 503 can exchange the payment token for payment with the payment server 504.

For example, in the event that a funds request time point has arrived (e.g., it is time for payment in connection with the electronic purchase) determined according to a funds request cycle, the merchant server 503 sends the payment token to the payment server 504.

At 535, a deduction operation on the authorized electronic account is executed. In some embodiments, in the event that the payment server 504 receives the payment token (e.g., from the merchant server 503), the payment server 504 executes a deduction operation on the authorized electronic account saved in correspondence with the transaction serial number in the payment token. The payment server 504 can perform a verification process to verify the payment token (e.g., to verify the authenticity of the payment token). For example, the payment server 504 can verify the payment server signature in the payment token. The payment server 504 can determine whether the signature from a payment server that is included in the payment token matches the signature of the payment server 504. In the event that the payment server 504 verifies the payment token, the payment server 504 executes a deduction operation on the authorized electronic account saved in correspondence with the transaction serial number in the payment token. The sum that is specifically deducted in connection with the deduction operation corresponds to the upcoming payment sum indicated by the upcoming payment information mapped from the transaction serial number in the payment token determined according to the mapping relationships locally established by the payment server between the transaction serial number, the upcoming payment sum information, and the information on the authorized electronic account.

At 536, a status notification of the funds deduction is communicated. In some embodiments, the payment server 504 communicates the notification of the successful funds deduction in response to successfully executing the deduction operation (e.g., the deduction operation at 535), or the notification of a failed funds deduction in response to a failed attempt at executing the deduction operation. The payment server 504 can send the notification of the successful funds deduction to the merchant server 503.

At 537, a status notification of a payment is communicated. In some embodiments, the merchant server 503 instructs the first client terminal 502 to display a notification of successful or failed payment. The notification of successful or failed payment can be communicated to the first client terminal 502. In the event that the first client terminal 502 receives the notification of the successful or failed payment, the first client terminal 502 can display a notification that the payment was successful or unsuccessful to the user 501. For example, the first client terminal 502 can provide an alert to the user 501 in the event that payment is successful or unsuccessful. The alert can be a notification provided by displaying the status information in text, a popup window showing the status, changing a brightness of a display, providing an alert via a sound, an indicator light, a vibration, the like, or any combination thereof.

In some embodiments, the merchant server 503 communicates the status notification of payment to the second client terminal 505. The notification of payment can be concurrently communicated to the first client terminal 502 and the second client terminal 505. In the event that the second client terminal 505 receives the notification of the payment, the second client terminal 505 can display a notification that the payment was successful or unsuccessful to the user 501. For example, the second client terminal 505 can provide an alert to the user 501 in the event that payment is successful or unsuccessful. The alert can be a notification provided by displaying a popup, changing a brightness of a display, providing an alert via a sound, an indicator light, a vibration, the like, or any combination thereof.

Figure 6:
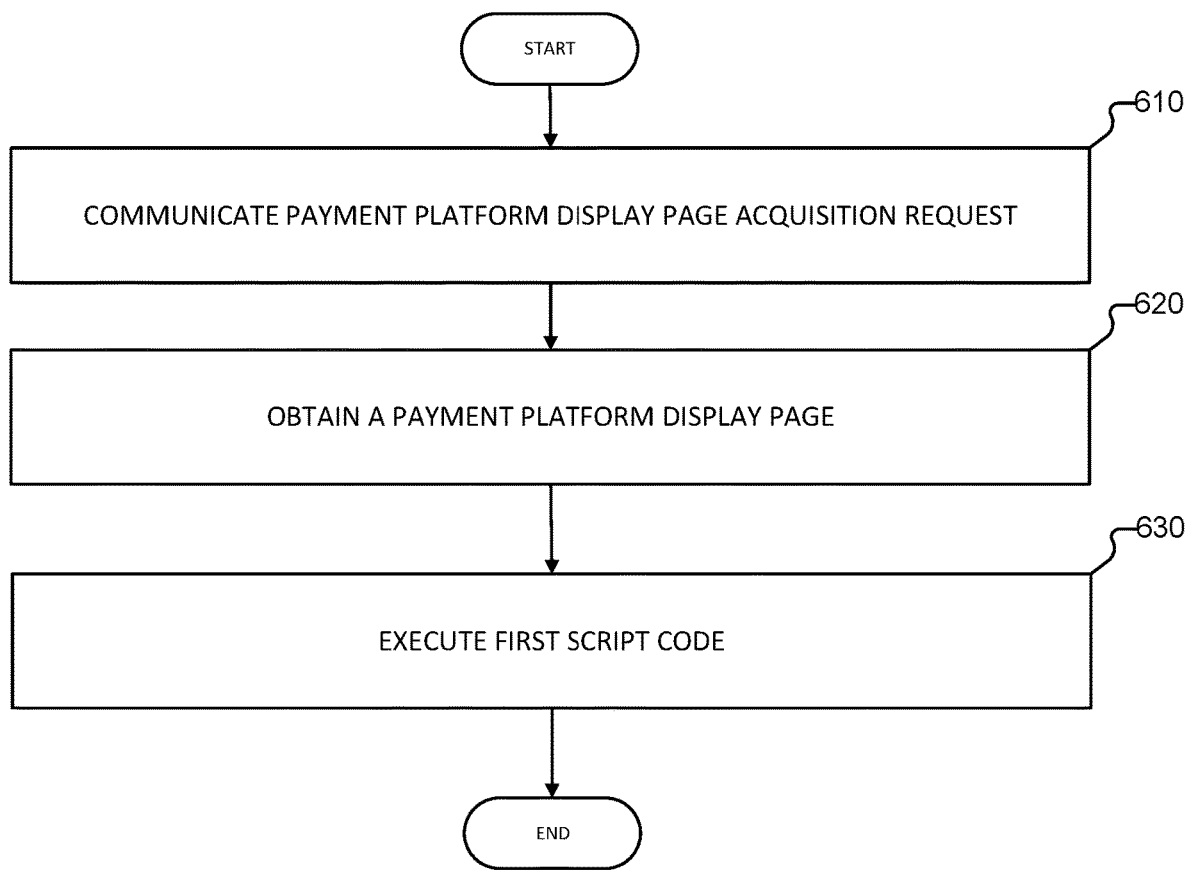
FIG. 6 is a flowchart of a method for displaying a payment page according to various embodiments of the present disclosure.

FIG. 6 is a flowchart of a method for displaying a payment page according to various embodiments of the present disclosure.

Referring to FIG. 6, a method 600 for displaying a payment page is provided. In some embodiments, process 600 can be implemented by device 700 of FIG. 7. In some embodiments, process 600 can be implemented by device 800 of FIG. 8. In some embodiments, process 600 can be implemented by device 900 of FIG. 9. In some embodiments, process 600 can be implemented by device 1000 of FIG. 10. In some embodiments, process 600 can be implemented by system 1300 of FIG. 13.

At 610, a payment platform display page acquisition request is communicated. In some embodiments, the first client terminal sends the payment platform display page acquisition request to a merchant server.

At 620, a payment platform display page is obtained. In some embodiments, the first client terminal can obtain the payment platform display page. For example, the first client terminal can receive the payment platform display page from the merchant server. In some embodiments, the payment platform display page has a first script code embedded therein. The first script code can be JS or the like. The first script code can be a program that accompanies an HTML page (e.g., the payment platform display page). The file script file code can be configured to cause the first client terminal to acquire a payment page that includes a digital object unique identifier from a payment server and to display the payment page (e.g., in response to the first client terminal receiving the payment page). For example, the first script code can redirect the first client terminal to the payment server. At 630, the first script code is executed. In some embodiments, the first client terminal executes the first script code. For example, in response to receiving the payment platform display page, the first client terminal can execute the first script code. The first script code can be embedded in the payment platform display page such that in the event that the payment platform display page is accessed (e.g., rendered, or otherwise displayed), the first script code is executed. In the event that the first client terminal displays the payment platform display page, the first client terminal executes the first script code and thereby acquires a payment page including a digital object unique identifier from a payment server and displays the payment page. In the event that the first client terminal displays the payment page, the second client terminal can execute an operation such that, upon confirming the upcoming payment sum indicated by the digital object unique identifier displayed by the first client terminal in connection with displaying the payment page, the second client terminal uses a personal mobile financial service to authorize an electronic account to pay the upcoming payment sum.

In some embodiments, the first script code includes a storage address of a second script file code in a payment server. In the event that the first script code includes the storage address of the second script file code in the payment server, the first client terminal can execute the first script code and thereby acquire the second script code from the payment server. The second script code can be JS or the like.

In the event that the first client terminal receives the second script code, the first client terminal can execute the second script code and thereby sends the upcoming payment sum information to the payment server and acquires a payment page including the digital object unique identifier from the payment server and displays the payment page.

In some embodiments, 610-630 of process 600 illustrated in FIG. 6 can be implemented by a client terminal. In some embodiments, 610-630 of process 600 can be implemented by the same client terminal. In some embodiments, 610 of process 600 can be implemented by a first client terminal, and 620 and 630 of process 600 can be implemented by a second client terminal. The first client terminal and the second client terminal can be different merchant servers. In some embodiments, various other devices can implement any of 610-630 of process 600.

Figure 7:
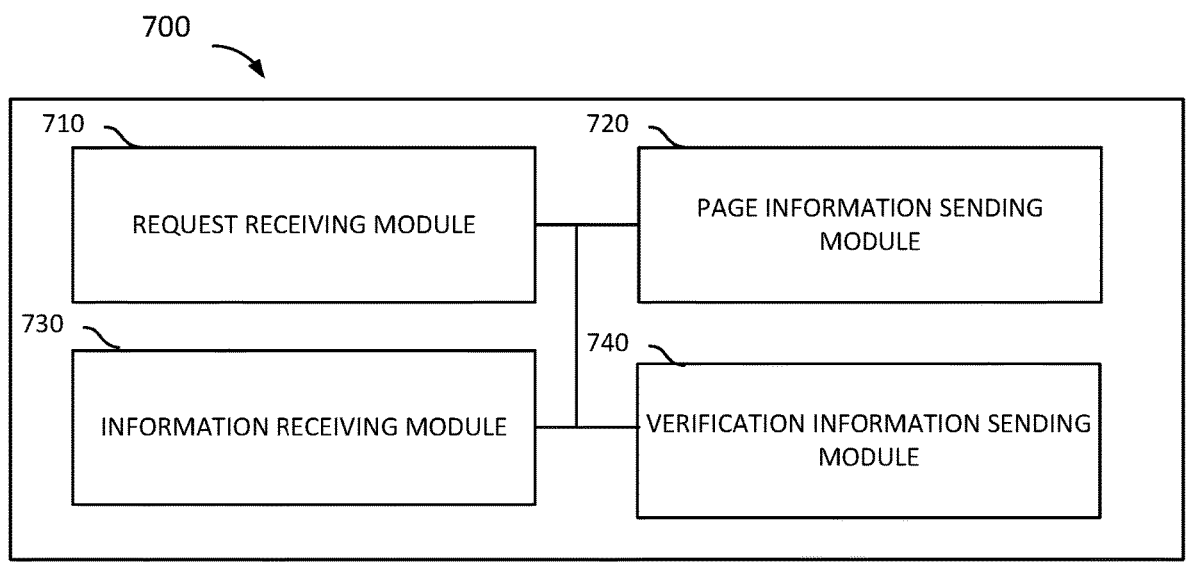
FIG. 7 is a structural diagram of a device for operating an electronic account according to various embodiments of the present disclosure.

FIG. 7 is a structural diagram of a device for operating an electronic account according to various embodiments of the present disclosure.

Referring to FIG. 7, a device 700 configured to operate an electronic account is provided. In some embodiments, device 700 is used to implement at least a part of method 200 of FIG. 2. In some embodiments, device 700 is used to implement at least a part of method 300 of FIG. 3. In some embodiments, device 700 is used to implement at least a part of method 400 of FIG. 4. In some embodiments, device 700 is used to implement at least a part of method 500 of FIG. 5. In some embodiments, device 700 can be implemented by system 1300 of FIG. 13. In some embodiments, the device 700 is implemented in a merchant server.

As illustrated in FIG. 7, the device 700 includes a request receiving module 710, a page information sending module 720, an information receiving module 730, and a verification information sending module 740.

In some embodiments, the request receiving module 710 is configured to receive a payment platform display page acquisition request. The request receiving module 710 can receive the payment platform display page acquisition request from a first client terminal.

In some embodiments, the page information sending module 720 is configured to provide a payment platform display page in which is embedded a first script code. For example, in the event that the request receiving module 710 receives the payment platform display page acquisition request, the page information sending module provides (e.g., communicates) to the first client terminal a payment platform display page. The payment platform display page can have a first script code embedded therein. The first script code can be JS or the like. The first script code can be a program that accompanies an HTML page (e.g., the payment platform display page). The file script file code can be configured to cause the first client terminal to acquire a payment page that includes a digital object unique identifier from a payment server and to display the payment page (e.g., in response to the first client terminal receiving the payment page). For example, the first script code can redirect the first client terminal to the payment server. The digital object unique identifier at least indicates the upcoming payment sum.

In some embodiments, the information receiving module 730 is configured to receive verification information. The payment server can issue the verification information. In some embodiments, the verification information is issued after a second client terminal confirms the upcoming payment sum indicated by the digital object unique identifier displayed by the first client terminal, and the second client terminal uses a personal mobile financial service to authorize an electronic account to pay the upcoming payment sum, thereupon triggering the payment server to issue the verification information.

In some embodiments, the verification information sending module 740 is configured to communicate the verification information. For example, the verification information sending module 740 can send the verification information to the payment server. The verification information sending module 740 can send the verification information received by the information receiving module 730 to the payment server to instruct the payment server to execute a deduction operation on the electronic account.

Figure 8:
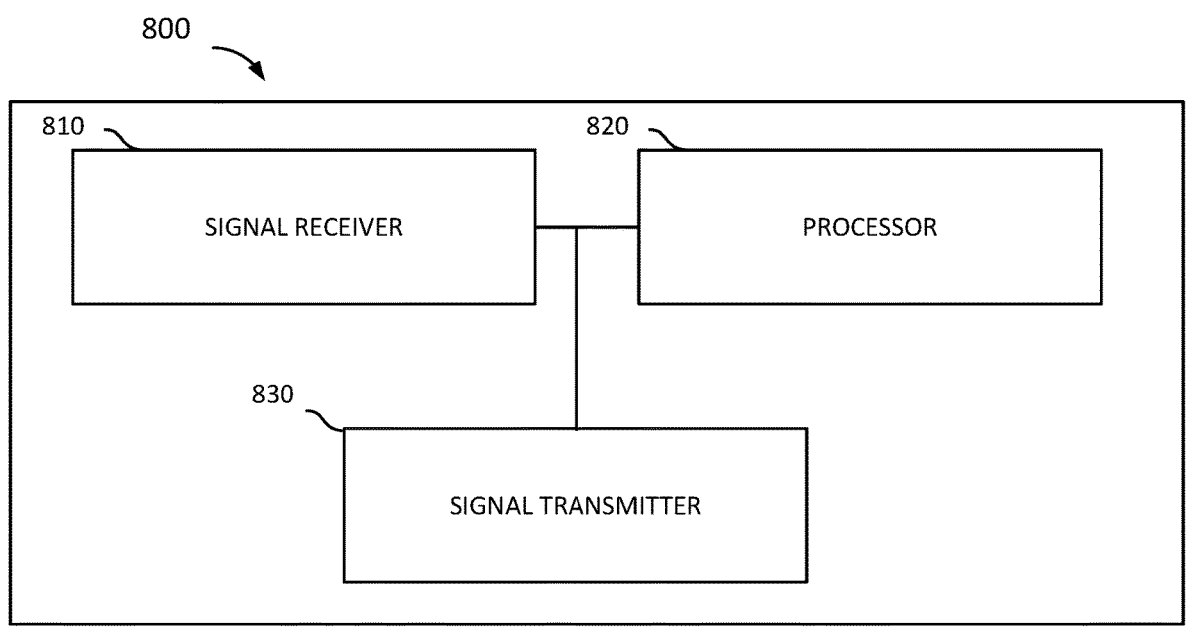
FIG. 8 is a structural diagram of a device for operating an electronic account according to various embodiments of the present disclosure.

FIG. 8 is a structural diagram of a device for operating an electronic account according to various embodiments of the present disclosure.

Referring to FIG. 8, a device 800 configured to operate an electronic account is provided. In some embodiments, device 800 is used to implement at least a part of method 200 of FIG. 2. In some embodiments, device 800 is used to implement at least a part of method 300 of FIG. 3. In some embodiments, device 800 is used to implement at least a part of method 400 of FIG. 4. In some embodiments, device 800 is used to implement at least a part of method 500 of FIG. 5. In some embodiments, device 800 can be implemented by system 1300 of FIG. 13. In some embodiments, the device 800 is implemented in a merchant server.

As illustrated in FIG. 8, device 800 includes a signal receiver 810, a processor 820, and a signal transmitter 830.

In some embodiments, the signal receiver 810 is configured to receive a payment platform display page acquisition request sent by a first client terminal or verification information sent by a payment server. In some embodiments, the verification information is issued after a second client terminal confirms the upcoming payment sum indicated by the digital object unique identifier displayed by the first client terminal, and the second client terminal uses a personal mobile financial service to authorize an electronic account to pay the upcoming payment sum, thereupon triggering the payment server to issue the verification information.

In some embodiments, the processor 820 is configured to control the signal transmitter 830 to provide the first client terminal with a payment platform display page in which is embedded a first script code. For example, in the event that the signal receiver 810 receives a payment platform display page authorization request, the processor 820 can control the signal transmitter 830 to provide the first client terminal with a payment platform display page. The payment platform display page can have a first script code embedded therein. The first script code can be JS or the like. The first script code can be a program that accompanies an HTML page (e.g., the payment platform display page). The file script code can be configured to cause the first client terminal to acquire a payment page that includes a digital object unique identifier from a payment server and to display the payment page (e.g., in response to the first client terminal receiving the payment page). For example, the first script code can redirect the first client terminal to the payment server. The digital object unique identifier at least indicates the upcoming payment sum.

In some embodiments, the signal transmitter 830 is configured to provide, under the control of the processor 820, the first client terminal with a payment platform display page in which a first script code is embedded. In some embodiments, the signal transmitter 830 is configured to send the verification information received by the signal receiver 810 to the payment server to instruct the payment server to execute a deduction operation on an electronic account.

Figure 9:
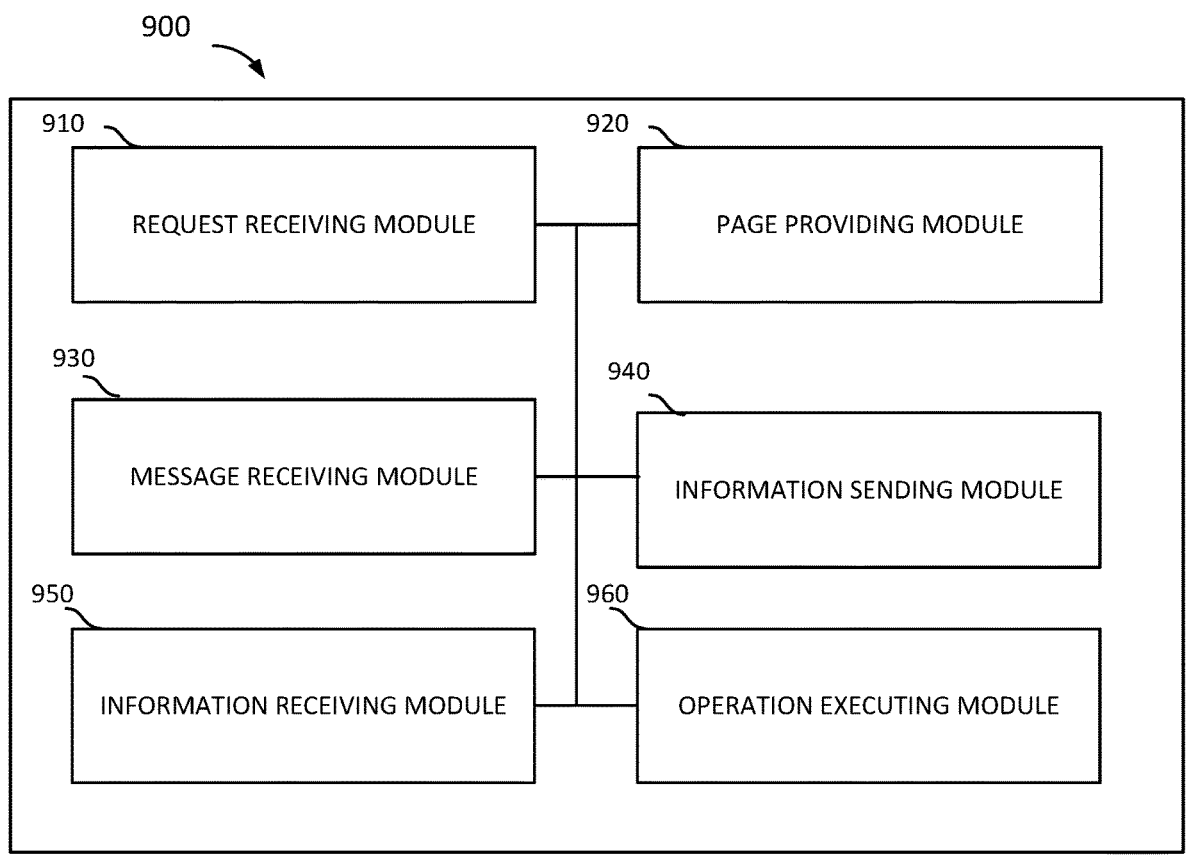
FIG. 9 is a structural diagram of a device for operating an electronic account according to various embodiments of the present disclosure.

FIG. 9 is a structural diagram of a device for operating an electronic account according to various embodiments of the present disclosure.

Referring to FIG. 9, a device 900 configured to operate an electronic account is provided. In some embodiments, device 900 is used to implement at least a part of method 200 of FIG. 2. In some embodiments, device 900 is used to implement at least a part of method 300 of FIG. 3. In some embodiments, device 900 is used to implement at least a part of method 400 of FIG. 4. In some embodiments, device 900 is used to implement at least a part of method 500 of FIG. 5. In some embodiments, device 900 can be implemented by system 1300 of FIG. 13. In some embodiments, the device 900 is implemented in a payment server.

As illustrated in FIG. 9, the device 900 includes a request receiving module 910, a page providing module 920, a message receiving module 930, an information sending module 940, an information receiving module 950, and an operation executing module 960.

In some embodiments, the request receiving module 910 is configured to receive a digital object unique identifier acquisition request sent by a first client terminal. The digital object unique identifier acquisition request can be sent by the first client terminal executing a first script code embedded in a payment platform display page.

In some embodiments, the page providing module 920 is configured to provide a payment page including a digital object unique identifier to the first client terminal. For example, the page providing module 920 can send the payment page to the first client terminal in the event that the request receiving module 910 has received the digital object unique identifier acquisition request.

In some embodiments, the message receiving module 930 is configured to receive an authorization notification sent by a second client terminal. The authorization notification can be sent to the message receiving module 930 in the event that the second client terminal confirms the upcoming payment sum indicated by the digital object unique identifier displayed by the first client terminal, and the second client terminal can use a personal mobile financial service to authorize an electronic account to pay the upcoming payment sum and thereupon the authorization notification is sent to the message receiving module 930.

In some embodiments, the information sending module 940 is configured to send verification information to a merchant server. For example, the information sending module 940 can send the verification information to the merchant server in the event that the message receiving module 930 receives the authorization notification.

In some embodiments, the information receiving module 950 is configured to receive the verification information sent by the merchant server.

In some embodiments, the operation executing module 960 is configured to execute a deduction operation on the electronic account. For example, the operation executing module 960 can execute the deduction operation on the electronic account in the event that the information receiving module 950 receives the verification information.

Figure 10:
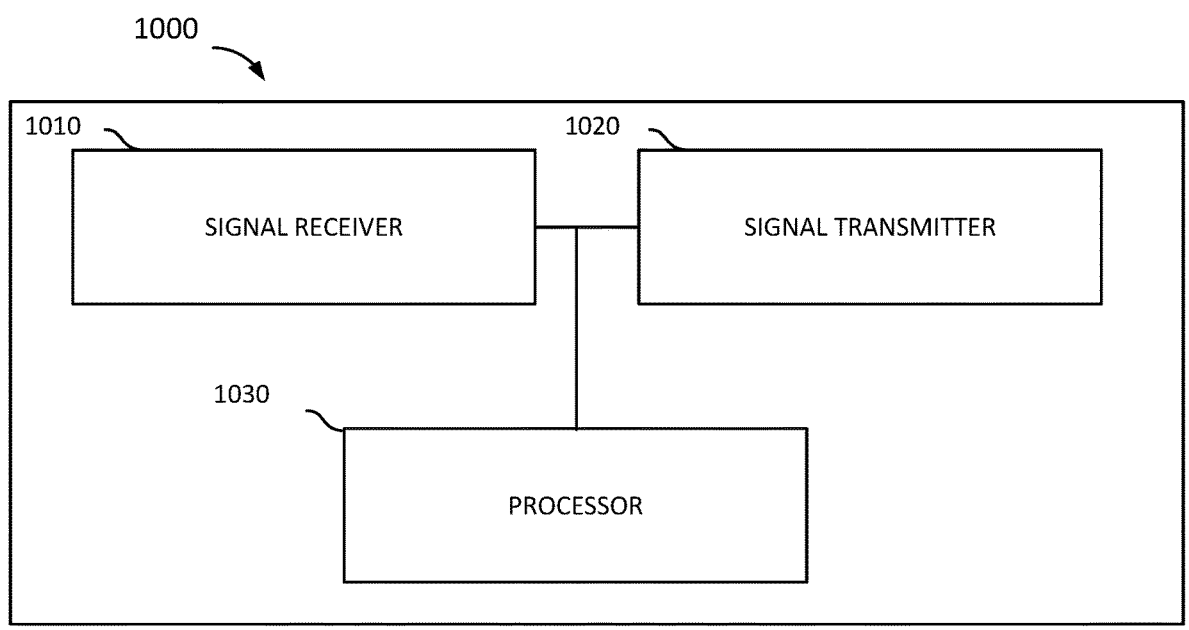
FIG. 10 is a structural diagram of a device for operating an electronic account according to various embodiments of the present disclosure.

FIG. 10 is a structural diagram of a device for operating an electronic account according to various embodiments of the present disclosure.

Referring to FIG. 10, a device 1000 configured to operate an electronic account is provided. In some embodiments, device 1000 is used to implement at least a part of method 200 of FIG. 2. In some embodiments, device 1000 is used to implement at least a part of method 300 of FIG. 3. In some embodiments, device 1000 is used to implement at least a part of method 400 of FIG. 4. In some embodiments, device 1000 is used to implement at least a part of method 500 of FIG. 5. In some embodiments, device 1000 can be implemented by system 1300 of FIG. 13. In some embodiments, the device 1000 is implemented in a payment server.

As illustrated in FIG. 10, the device 1000 includes a signal receiver 1010, a signal transmitter 1020, and a processor 1030.

In some embodiments, the signal receiver 1010 is configured to receive a digital object unique identifier acquisition request sent by a first client terminal, receive an authorization notification sent by a second client terminal, and verification information sent by a merchant server. The digital object unique identifier acquisition request can be sent by the first client terminal in the event that the first client terminal executes a first script code embedded in a payment platform display page. The authorization notification can be sent in the event that the second client terminal confirms the upcoming payment sum indicated by the digital object unique identifier displayed by the first client terminal, and the second client terminal uses a personal mobile financial service to authorize an electronic account to pay the upcoming payment sum and thereupon send the authorization notification.

In some embodiments, the signal transmitter 1020 is configured to provide a payment page including a digital object unique identifier to the first client terminal. For example, the signal transmitter can send the digital object unique identifier in the event that the signal receiver 1010 has received the digital object unique identifier acquisition request. In the event that the signal receiver 1010 receives the authorization notification, the signal receiver 1010 can send the verification information to the merchant server.

In the event that the signal receiver 1010 receives verification information sent by the merchant server, a deduction operation is executed on the electronic account. In some embodiments, the processor 1030 can execute the deduction operation on the electronic account.

Figure 11:
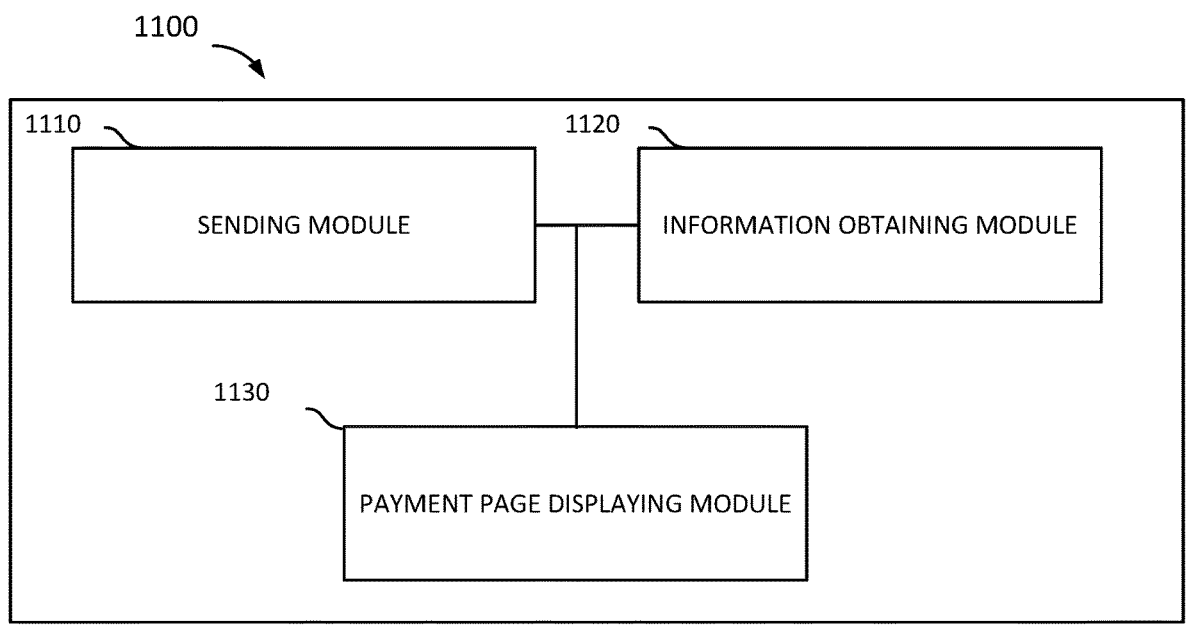
FIG. 11 is a structural diagram of a device for displaying a payment page according to various embodiments of the present disclosure.

FIG. 11 is a structural diagram of a device for displaying a payment page according to various embodiments of the present disclosure.

Referring to FIG. 11, a device 1100 configured to display a payment page is provided. In some embodiments, device 1100 is used to implement at least a part of method 200 of FIG. 2. In some embodiments, device 1100 is used to implement at least a part of method 300 of FIG. 3. In some embodiments, device 1100 is used to implement at least a part of method 400 of FIG. 4. In some embodiments, device 1100 is used to implement at least a part of method 500 of FIG. 5. In some embodiments, device 1100 can be implemented by system 1300 of FIG. 13. In some embodiments, the device 1100 is implemented in a client terminal.

As illustrated in FIG. 11, the device 1100 includes a sending module 1110, an information obtaining module 1120, and a payment page displaying module 1130.

In some embodiments, the sending module 1110 is configured to send a payment platform display page acquisition request to a merchant server.

In some embodiments, the information obtaining module 1120 is configured to obtain from the merchant server the payment platform display page in which a first script code is embedded. For example, the information obtaining module 1120 can obtain the payment platform display page in the event that the request sending module 1110 sends the payment platform display page acquisition request. The first script code can be JS or the like. The first script code can be a program that accompanies an HTML page (e.g., the payment platform display page). The file script file code can be configured to cause a client terminal to acquire a payment page that includes a digital object unique identifier from a payment server and to display the payment page (e.g., in response to the first client terminal receiving the payment page). For example, the first script code can redirect the client terminal to the payment server.

In some embodiments, the payment page displaying module 1130 is configured to execute the first script code embedded in the payment platform display page obtained by the information obtaining module 1120 and thereby acquire a payment page containing a digital object unique identifier from a payment server and display the payment page.

In the event that the payment page is displayed, the upcoming payment sum indicated by the digital object unique identifier can be confirmed. In response to confirming the upcoming payment sum indicated by the digital object unique identifier that is displayed, a personal mobile financial service can be used to authorize an electronic account to pay the upcoming payment. A user can use the personal mobile financial service to authorize the electronic account to pay the upcoming payment. For example, the user can use a client terminal to access the personal mobile financial service.

Figure 12:
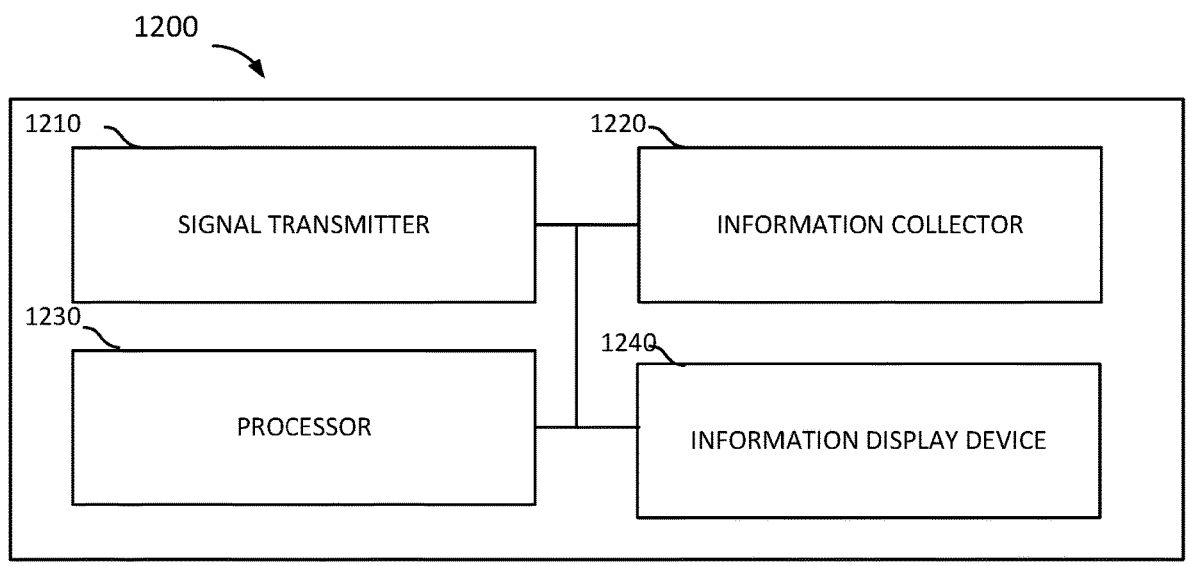
FIG. 12 is a structural diagram of a device for displaying a payment page according to various embodiments of the present disclosure.

FIG. 12 is a structural diagram of a device for displaying a payment page according to various embodiments of the present disclosure.

Referring to FIG. 12, a device 1200 configured to display a payment page is provided. In some embodiments, device 1200 is used to implement at least a part of method 200 of FIG. 2. In some embodiments, device 1200 is used to implement at least a part of method 300 of FIG. 3. In some embodiments, device 1200 is used to implement at least a part of method 400 of FIG. 4. In some embodiments, device 1200 is used to implement at least a part of method 500 of FIG. 5. In some embodiments, device 1200 can be implemented by system 1300 of FIG. 13. In some embodiments, the device 1200 is implemented in a client terminal.

As illustrated in FIG. 12, the device 1200 includes a signal transmitter 1210, an information collector 1220, a processor 1230, and an information display device 1240.

In some embodiments, the signal transmitter 1210 is configured to send a payment platform display page acquisition request to a merchant server.

In some embodiments, the information collector 1220 is configured to obtain a payment platform display page in which a first script code is embedded. The first script code can be JS or the like. The first script code can be a program that accompanies an HTML page (e.g., the payment platform display page). The file script file code can be configured to cause a client terminal to acquire a payment page that includes a digital object unique identifier from a payment server and to display the payment page (e.g., in response to the first client terminal receiving the payment page). For example, the first script code can redirect the client terminal to the payment server. The information collector 1220 can obtain the payment platform display page in the event that the signal transmitter 1210 has sent a payment platform display page acquisition request. In some embodiments, the information collector is configured to acquire, under the control of the processor 1230, a payment page including a digital object unique identifier from a payment server.

In some embodiments, the processor 1230 is configured to execute the first script code and thereby control the information collector 1220 to acquire the payment page including the digital object unique identifier from the payment server.

In some embodiments, the information display device 1240 is configured to display the payment page including the digital object unique identifier acquired by the information collector 1220.

In the event that the payment page is displayed, a user of the device 1200 can confirm the upcoming payment sum indicated by the digital object unique identifier that is displayed. The upcoming payment sum indicated by the digital object unique identifier that is displayed can be confirmed using a personal mobile financial service to authorize an electronic account to pay the upcoming payment.

Figure 13:
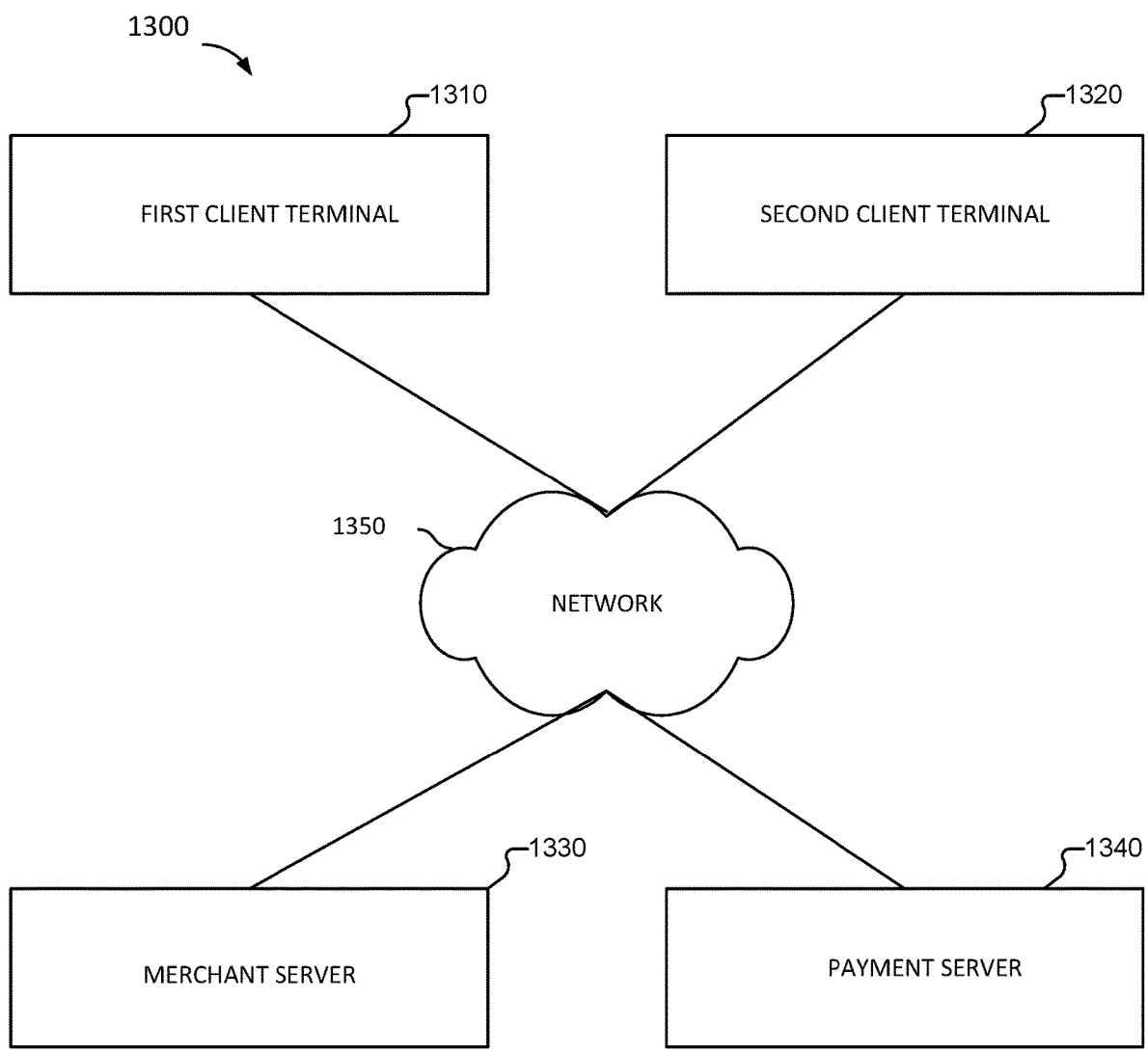
FIG. 13 is a structural block diagram of a system for processing an online transaction according to various embodiments of the present disclosure.

FIG. 13 is a structural block diagram of a system for processing an online transaction according to various embodiments of the present disclosure.

Referring to FIG. 13, a system 1300 for processing an online transaction is provided. In some embodiments, the system 1300 implements the method 200 of FIG. 2. In some embodiments, the system 1300 implements the method 300 of FIG. 3. In some embodiments, the system 1300 implements the method 400 of FIG. 4. In some embodiments, the system 1300 implements the method 500 of FIG. 5. In some embodiments, the system 1300 implements the method 600 of FIG. 6. In some embodiments, the system 1300 implements the device 700 of FIG. 7. In some embodiments, the system 1300 implements the device 800 of FIG. 8. In some embodiments, the system 1300 implements the device 900 of FIG. 9. In some embodiments, the system 1300 implements the device 1000 of FIG. 10. In some embodiments, the system 1300 implements the device 1100 of FIG. 11. In some embodiments, the system 1300 implements the device 1200 of FIG. 12.

The system 1300 for processing an online transaction includes a first client terminal 1310, a second client terminal 1320, a merchant server 1330, and a payment server 1340. The system 1300 can include a network 1350 over which the first client terminal 1310, the second client terminal 1320, the merchant server 1330, and the payment server 1340 can communicate. The network 1350 can be a LAN, a Wide Area Network (WAN), the Internet, or the like. In some embodiments, the various devices of the system 1300 (e.g., devices 1310, 1320, 1330, and 1340) can communicate over a direct connection between one another (e.g., a WiFi Direct connection, a Bluetooth connection, an infrared connection, or the like).

Figure 14:
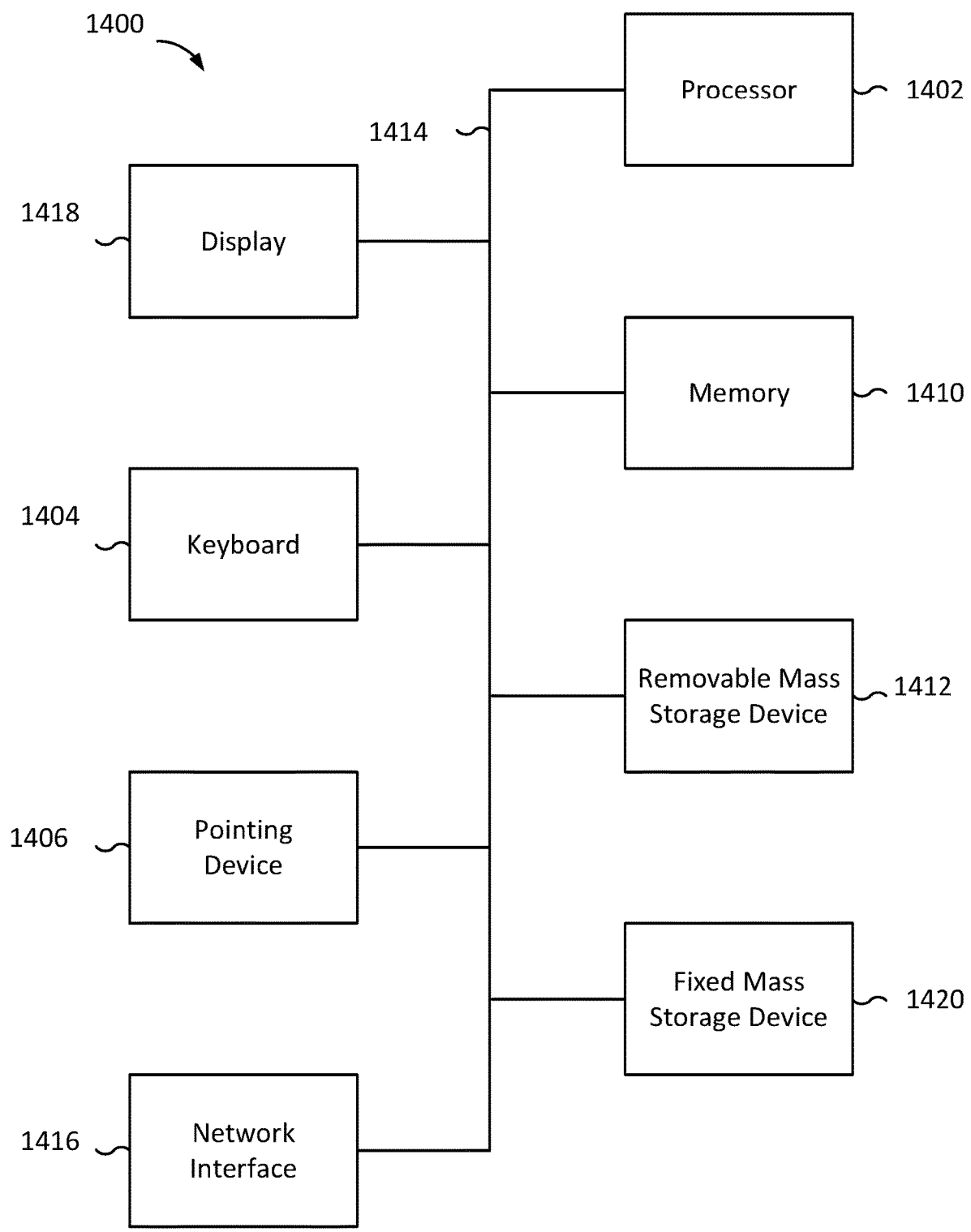
FIG. 14 is a functional diagram of a computer system for processing an online transaction according to various embodiments of the present disclosure.

FIG. 14 is a functional diagram of a computer system for processing an online transaction according to various embodiments of the present disclosure.

Referring to FIG. 14, a computer system 1400 for processing an online transaction is provided. As will be apparent, other computer system architectures and configurations can be used to implement processing of online transactions. Computer system 1400, which includes various subsystems as described below, includes at least one microprocessor subsystem (also referred to as a processor or a central processing unit (CPU)) 1402. For example, processor 1402 can be implemented by a single-chip processor or by multiple processors. In some embodiments, processor 1402 is a general purpose digital processor that controls the operation of the computer system 1400. Using instructions retrieved from memory 1410, the processor 1402 controls the reception and manipulation of input data, and the output and display of data on output devices (e.g., display 1418).

Processor 1402 is coupled bi-directionally with memory 1410, which can include a first primary storage, typically a random access memory (RAM), and a second primary storage area, typically a read-only memory (ROM). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 1402. Also as is well known in the art, primary storage typically includes basic operating instructions, program code, data, and objects used by the processor 1402 to perform its functions (e.g., programmed instructions). For example, memory 1410 can include any suitable computer-readable storage media, described below, depending on whether, for example, data access needs to be bi-directional or uni-directional. For example, processor 1402 can also directly and very rapidly retrieve and store frequently needed data in a cache memory (not shown). The memory can be a non-transitory computer-readable storage medium.

A removable mass storage device 1412 provides additional data storage capacity for the computer system 1400, and is coupled either bi-directionally (read/write) or uni-directionally (read only) to processor 1402. For example, storage 1412 can also include computer-readable media such as magnetic tape, flash memory, PC-CARDS, portable mass storage devices, holographic storage devices, and other storage devices. A fixed mass storage 1420 can also, for example, provide additional data storage capacity. The most common example of mass storage 1420 is a hard disk drive. Mass storage device 1412 and fixed mass storage 1420 generally store additional programming instructions, data, and the like that typically are not in active use by the processor 1402. It will be appreciated that the information retained within mass storage device 1412 and fixed mass storage 1420 can be incorporated, if needed, in standard fashion as part of memory 1410 (e.g., RAM) as virtual memory.

In addition to providing processor 1402 access to storage subsystems, bus 1414 can also be used to provide access to other subsystems and devices. As shown, these can include a display monitor 1418, a network interface 1416, a keyboard 1404, and a pointing device 1406, as well as an auxiliary input/output device interface, a sound card, speakers, and other subsystems as needed. For example, the pointing device 1406 can be a mouse, stylus, track ball, or tablet, and is useful for interacting with a graphical user interface.

The network interface 1416 allows processor 1402 to be coupled to another computer, computer network, or telecommunications network using a network connection as shown. For example, through the network interface 1416, the processor 1402 can receive information (e.g., data objects or program instructions) from another network or output information to another network in the course of performing method/process steps. Information, often represented as a sequence of instructions to be executed on a processor, can be received from and outputted to another network. An interface card or similar device and appropriate software implemented by (e.g., executed/performed on) processor 1402 can be used to connect the computer system 1400 to an external network and transfer data according to standard protocols. For example, various process embodiments disclosed herein can be executed on processor 1402, or can be performed across a network such as the Internet, intranet networks, or local area networks, in conjunction with a remote processor that shares a portion of the processing. Additional mass storage devices (not shown) can also be connected to processor 1402 through network interface 1416.

An auxiliary I/O device interface (not shown) can be used in conjunction with computer system 1400. The auxiliary I/O device interface can include general and customized interfaces that allow the processor 1402 to send and, more typically, receive data from other devices such as microphones, touch-sensitive displays, transducer card readers, tape readers, voice or handwriting recognizers, biometrics readers, cameras, portable mass storage devices, and other computers.

The computer system shown in FIG. 14 is but an example of a computer system suitable for use with the various embodiments disclosed herein. Other computer systems suitable for such use can include additional or fewer subsystems. In addition, bus 1414 is illustrative of any interconnection scheme serving to link the subsystems. Other computer architectures having different configurations of subsystems can also be utilized.

The above-stated are merely embodiments of the present application and do not limit the present application. For persons skilled in the art, the present application may have various modifications and variations. Any modification, equivalent substitution, or improvement made in keeping with the spirit and principles of the present application shall be included within the scope of the claims of the present application.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
receiving, by one or more merchant servers, a payment platform display page acquisition request from a first client terminal via one or more networks, the payment platform display page acquisition request being provided by the first client terminal in connection with an online transaction with an e-commerce platform;
providing, by the one or more merchant servers, a payment platform display page to the first client terminal, wherein:
the payment platform display page includes first script code;
in response to the first client terminal executing the first script code, the first script code causes the first client terminal to obtain second script code from a payment server, and to execute the second script code to obtain a payment page including a digital object unique identifier from the payment server and to display the payment page;
the digital object unique identifier indicates an upcoming payment sum;
the payment server is different from the one or more merchant servers; and
the digital object unique identifier is generated in response to information pertaining to the upcoming payment sum being provided to the payment server by the first client terminal;
receiving, by the one or more merchant servers, verification information in connection with an authorization for the online transaction being communicated by a second client terminal, wherein:

the second client terminal obtains the verification information based at least in part on obtaining the digital object unique identifier from the first client terminal in response to the first client terminal obtaining the digital unique identifier from the payment server; and the verification information includes a payment sum, information pertaining to the payment server identity, and an identifier corresponding to the online transaction; and in response to receiving the verification information, sending, by the one or more merchant servers, the verification information to the payment server to instruct the payment server to execute a deduction operation on an electronic account in connection with completion of the online transaction, the verification information being sent to the payment server via one or more networks.

2. The method of claim 1, further comprising:
issuing the verification information, wherein issuing the verification information comprises:
causing to be displayed, by the first client terminal, the digital object unique identifier;
receiving, from the second client terminal, a confirmation of the upcoming payment sum indicated by the digital object unique identifier; and
sending an indication of the confirmation of the upcoming payment sum to the payment server, the indication of the confirmation of the upcoming payment sum corresponding to the authorization for the online transaction communicated by the second client terminal.

3. The method of claim 2, wherein the confirmation of the upcoming payment sum indicated by the digital object unique identifier is obtained using a personal mobile financial service provided to a user to authorize the electronic account to pay the upcoming payment sum.

4. The method of claim 1, wherein:
the first script code includes a storage address of the second script code in the payment server; and
in response to the second script code being executed, the second script code causes the first client terminal to:
send upcoming payment sum information to the payment server; and
in response to obtaining the payment page from the payment server, display the payment page.

5. The method of claim 1, wherein:
the verification information includes electronic account information and upcoming payment sum information; and
the sending the verification information to the payment server to instruct the payment server to execute the deduction operation on the electronic account comprises:
sending the verification information to the payment server to instruct the payment server to execute the deduction operation on the electronic account according to the electronic account information and the upcoming payment sum information included in the verification information.

6. The method of claim 1, wherein:
the verification information includes a transaction serial number;
the sending the verification information to the payment server to instruct the payment server to execute the deduction operation on the electronic account comprises:
sending the verification information to the payment server;

the payment server uses a mapping relationship between the transaction serial number, electronic account information, and upcoming payment sum information to look up the electronic account information and the upcoming payment sum information mapped to the transaction serial number included in the verification information; and the payment server executes the deduction operation on the electronic account according to the electronic account information and the upcoming payment sum information mapped to the transaction serial number.

7. The method of claim 1, wherein the first script code includes a storage address of a second script code in the payment server.

8. The method of claim 1, wherein the first script code redirects the first client terminal to the payment server in response to the first script code being executed.

9. The method of claim 1, wherein the first script code is JavaScript embedded in the payment platform display page, the first script code being executed in response to accessing the payment platform display page, and the first script code causing the first client terminal to be redirected to the payment server in response to the first script code being executed.

10. The method of claim 1, wherein the first script code comprises a payment server address corresponding to the payment server.

11. The method of claim 1, wherein the verification information corresponds to an electronic signature comprising at least payment server identity information and information pertaining to the upcoming payment sum information.

12. The method of claim 1, wherein the verification information is received in connection with the second client terminal executing a personal mobile financial service application to authorize the deduction operation for the online transaction based at least in part on the digital object unique identifier.

13. A device, comprising:
at least one processor associated with a merchant server, the at least one processors configured to:
receive, from a first client terminal via one or more networks, a payment platform display page acquisition request, the payment platform display page acquisition request being provided by the first client terminal in connection with an online transaction with an e-commerce platform;
provide, to the first client terminal, a payment platform display page, wherein:
the payment platform display page includes first script code;
in response to the first client terminal executing the first script code, the first script code causes the first client terminal to obtain second script code from a payment server, and to execute the second script code to obtain a payment page including a digital object unique identifier from the payment server and to display the payment page;
the digital object unique identifier indicates an upcoming payment sum; and
the digital object unique identifier is generated in response to information pertaining to the upcoming payment sum being provided to the payment server by the first client terminal;

receive verification information in connection with an authorization for the online transaction being communicated by a second client terminal, wherein:
the second client terminal obtains the verification information based at least in part on obtaining the digital object unique identifier from the first client terminal in response to the first client terminal obtaining the digital unique identifier from the payment server; and
the verification information includes a payment sum, information pertaining to the payment server identity, and an identifier corresponding to the online transaction; and
in response to receiving the verification information, send the verification information to the payment server to instruct the payment server to execute a deduction operation on an electronic account in connection with completion of the online transaction, the verification information being sent to the payment server via one or more networks; and
a memory coupled to the at least one processor and configured to provide the at least one processor with instructions.

14. The device of claim 13, wherein the at least one processor is further configured to:
issue the verification information, wherein issuing the verification information comprises:
causing to be displayed, by the first client terminal, the digital object unique identifier;
receiving, from the second client terminal, a confirmation of the upcoming payment sum indicated by the digital object unique identifier; and
sending an indication of the confirmation of the upcoming payment sum to the payment server, the indication of the confirmation of the upcoming payment sum corresponding to the authorization for the online transaction communicated by the second client terminal.

15. The device of claim 14, wherein the confirmation of the upcoming payment sum indicated by the digital object unique identifier is obtained using a personal mobile financial service provided to a user to authorize the electronic account to pay the upcoming payment sum.

16. The device of claim 13, wherein:
the first script code includes a storage address of a second script code in the payment server; and
in response to the second script code being, the second script code causes the first client terminal to:
send upcoming payment sum information to the payment server; and
in response to obtaining the payment page from the payment server, display the payment page.

17. The device of claim 13, wherein:
the verification information includes electronic account information and upcoming payment sum information; and
the at least one processor is further configured to send the verification information to the payment server to instruct the payment server to execute the deduction operation on the electronic account according to the electronic account information and the upcoming payment sum information included in the verification information.

18. The device of claim 13, wherein:
the verification information includes a transaction serial number;
the at least one processor is further configured to send the verification information to the payment server;
the payment server uses a mapping relationship between the transaction serial number, electronic account information, and upcoming payment sum information to look up the electronic account information and the upcoming payment sum information mapped to the transaction serial number included in the verification information; and
the payment server executes the deduction operation on the electronic account according to the electronic account information and the upcoming payment sum information mapped to the transaction serial number.

19. A computer program product, the computer program product being embodied in a non-transitory computer readable storage medium and comprising computer instructions for:
receiving, by one or more merchant servers, a payment platform display page acquisition request from a first client terminal via one or more networks, the payment platform display page acquisition request being provided by the first client terminal in connection with an online transaction with an e-commerce platform;
providing, by the one or more merchant servers, a payment platform display page to the first client terminal, wherein:
the payment platform display page includes first script code;
in response to the first client terminal executing the first script code, the first script code causes the first client terminal to obtain second script code from a payment server, and to execute the second script code to obtain a payment page including a digital object unique identifier from the payment server and to display the payment page;
the digital object unique identifier indicates an upcoming payment sum;
the payment server is different from the one or more merchant server; and
the digital object unique identifier is generated in response to information pertaining to the upcoming payment sum being provided to the payment server by the first client terminal;
receiving, by the one or more merchant servers, verification information in connection with an authorization for the online transaction being communicated by a second client terminal, wherein:
the second client terminal obtains the verification information based at least in part on obtaining the digital object unique identifier from the first client terminal in response to the first client terminal obtaining the digital unique identifier from the payment server; and
the verification information includes a payment sum, information pertaining to the payment server identity, and an identifier corresponding to the online transaction; and
in response to receiving the verification information, sending, by the one or more merchant servers, the verification information to the payment server to instruct the payment server to execute a deduction operation on an electronic account in connection with completion of the online transaction, the verification information being sent to the payment server via one or more networks.

20. The computer program product of claim 19, further comprising instructions for:

issuing the verification information, wherein instructions for issuing the verification information comprise instructions for:
   causing to be displayed, by the first client terminal, the digital object unique identifier;
   receiving, from the second client terminal, a confirmation of the upcoming payment sum indicated by the digital object unique identifier; and
   sending an indication of the confirmation of the upcoming payment sum to the payment server, the indication of the confirmation of the upcoming payment sum corresponding to the authorization for the online transaction communicated by the second client terminal.

21. The computer program product of claim 20, wherein the confirmation of the upcoming payment sum indicated by the digital object unique identifier is obtained using a personal mobile financial service provided to a user to authorize the electronic account to pay the upcoming payment sum.

22. The computer program product of claim 19, wherein:
the first script code includes a storage address of a second script code in the payment server; and
in response to the second script code being executed, the second script code causes the first client terminal to:
   send upcoming payment sum information to the payment server; and
   in response to obtaining the payment page from the payment server, display the payment page.

23. The computer program product of claim 19, wherein:
the verification information includes electronic account information and upcoming payment sum information; and
the computer program product further comprises instructions for sending the verification information to the payment server to instruct the payment server to execute the deduction operation on the electronic account according to the electronic account information and the upcoming payment sum information included in the verification information.

24. The computer program product of claim 19, wherein:
the verification information includes a transaction serial number;
the computer program product further comprises instructions for sending the verification information to the payment server;
the payment server uses a mapping relationship between the transaction serial number, electronic account information, and upcoming payment sum information to look up the electronic account information and the upcoming payment sum information mapped to the transaction serial number included in the verification information; and
the payment server executes the deduction operation on the electronic account according to the electronic account information and the upcoming payment sum information mapped to the transaction serial number.

\* \* \* \* \*

UNITED STATES PATENT AND TRADEMARK OFFICE
CERTIFICATE OF CORRECTION

PATENT NO. : 10,902,393 B2  
APPLICATION NO. : 14/710075  
DATED : January 26, 2021  
INVENTOR(S) : Hui Wu et al.

Page 1 of 1

It is certified that error appears in the above-identified patent and that said Letters Patent is hereby corrected as shown below:

On the Title Page

Item (73), assignee, address, after "Advanced New Technologies Co., Ltd.", insert -- (KY) --.

Signed and Sealed this  
Twenty-ninth Day of June, 2021

Drew Hirshfeld  
*Performing the Functions and Duties of the*  
*Under Secretary of Commerce for Intellectual Property and*  
*Director of the United States Patent and Trademark Office*